(12) United States Patent
Benjebbour et al.

(10) Patent No.: US 8,983,485 B2
(45) Date of Patent: Mar. 17, 2015

(54) BASE STATION APPARATUS, MOBILE TERMINAL APPARATUS AND SCHEDULING METHOD

(75) Inventors: Anass Benjebbour, Tokyo (JP); Satoshi Nagata, Tokyo (JP)

(73) Assignee: NTT DOCOMO, Inc., Tokyo (JP)

( * ) Notice: Subject to any disclaimer, the term of this patent is extended or adjusted under 35 U.S.C. 154(b) by 25 days.

(21) Appl. No.: 13/881,486

(22) PCT Filed: Sep. 22, 2011

(86) PCT No.: PCT/JP2011/071711
§ 371 (c)(1),
(2), (4) Date: Jun. 12, 2013

(87) PCT Pub. No.: WO2012/056833
PCT Pub. Date: May 3, 2012

(65) Prior Publication Data
US 2013/0252625 A1 Sep. 26, 2013

(30) Foreign Application Priority Data
Oct. 27, 2010 (JP) .................................. 2010-240751

(51) Int. Cl.
| | |
|---|---|
| H04W 88/02 | (2009.01) |
| H04W 72/08 | (2009.01) |
| H04W 16/02 | (2009.01) |
| H04L 5/00 | (2006.01) |
| H04W 16/24 | (2009.01) |

(52) U.S. Cl.
CPC ............ *H04W 72/085* (2013.01); *H04W 16/02* (2013.01); *H04L 5/0037* (2013.01); *H04L 5/006* (2013.01); *H04L 5/0092* (2013.01); *H04L 5/0071* (2013.01); *H04W 16/24* (2013.01); *H04W 72/08* (2013.01); *H04L 5/001* (2013.01); *H04L 5/0035* (2013.01)
USPC ................................................ 455/452.1

(58) Field of Classification Search
USPC ............ 455/452.1, 453, 456.1, 501; 370/230, 370/252, 260, 329, 338
See application file for complete search history.

(56) References Cited

U.S. PATENT DOCUMENTS

| | | | |
|---|---|---|---|
| 2006/0030333 A1* | 2/2006 | Ward et al. ................. | 455/456.1 |
| 2011/0075748 A1* | 3/2011 | Novak et al. .................. | 375/260 |
| 2012/0033571 A1* | 2/2012 | Shimezawa et al. .......... | 370/252 |

OTHER PUBLICATIONS

International Search Report issued in PCT/JP2011/071711 mailed Oct. 18, 2011 (2 pages).

(Continued)

*Primary Examiner* — Diane Mizrahi
(74) *Attorney, Agent, or Firm* — Osha Liang LLP

(57) ABSTRACT

To provide a base station apparatus, mobile terminal apparatus and scheduling method for enabling fairness of user throughput to be improved, a scheduling method is characterized by having the steps of notifying a mobile terminal apparatus of allocation information of radio resources to each cluster pattern with a plurality of cluster patterns comprised of clusters formed of a plurality of adjacent sectors predefined and with different radio resources allocated for each of the cluster patterns, receiving channel information•channel quality information corresponding to each of the cluster patterns for each of the radio resources from the mobile terminal apparatus, and controlling allocation of the radio resources to the mobile terminal apparatus, based on the channel information•channel quality information, where at least one of the cluster patterns is a coordinated cluster pattern to perform coordinated transmission between adjacent sectors in a cluster.

18 Claims, 19 Drawing Sheets

LOCALIZED RESOURCE ALLOCATION

BW: BANDWIDTH

▨ #1 (S1,S2) (S3,S4) (S5,S6)
▩ #2 (S6,S1) (S2,S3) (S4,S5)
▯ #2 S1–S6

(56) References Cited

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", Sep. 2006 (57 pages).

* cited by examiner

CLUSTER PATTERN#1
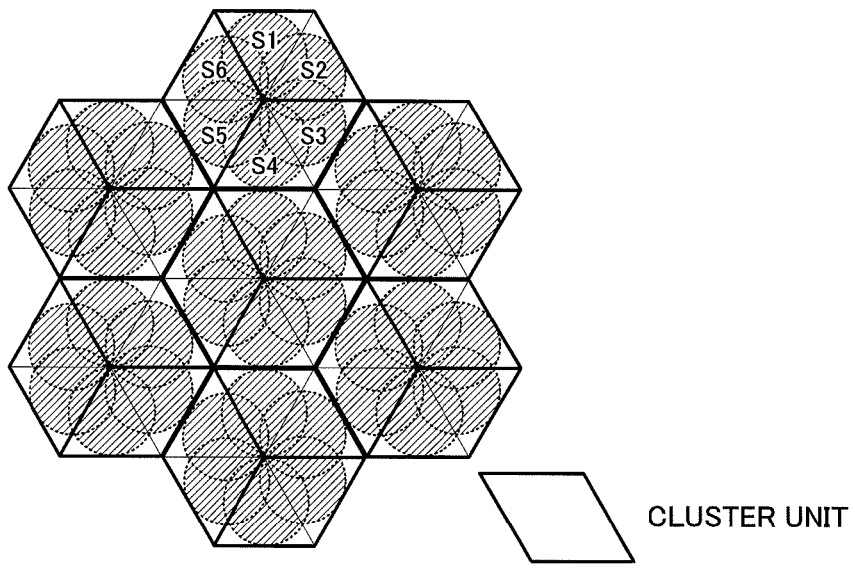
FIG. 3A
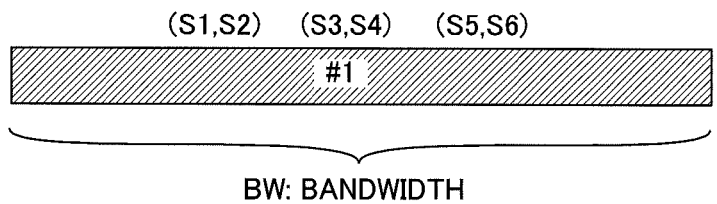
FIG. 3B
FIG. 3C

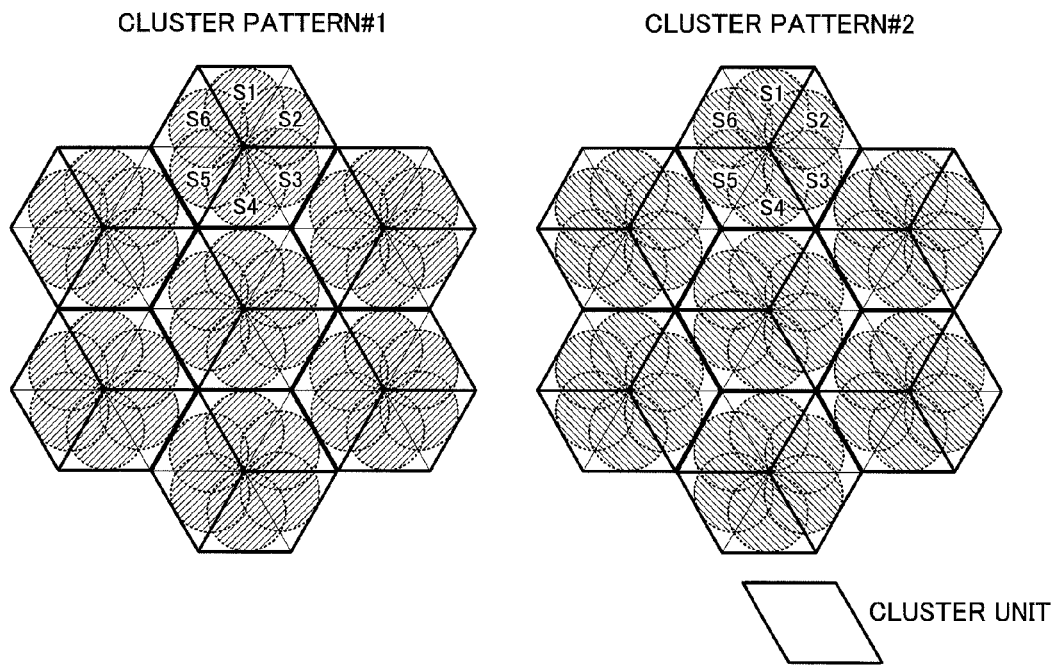
FIG. 4A
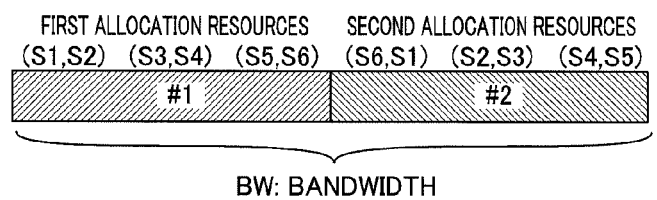
FIG. 4B
FIG. 4C

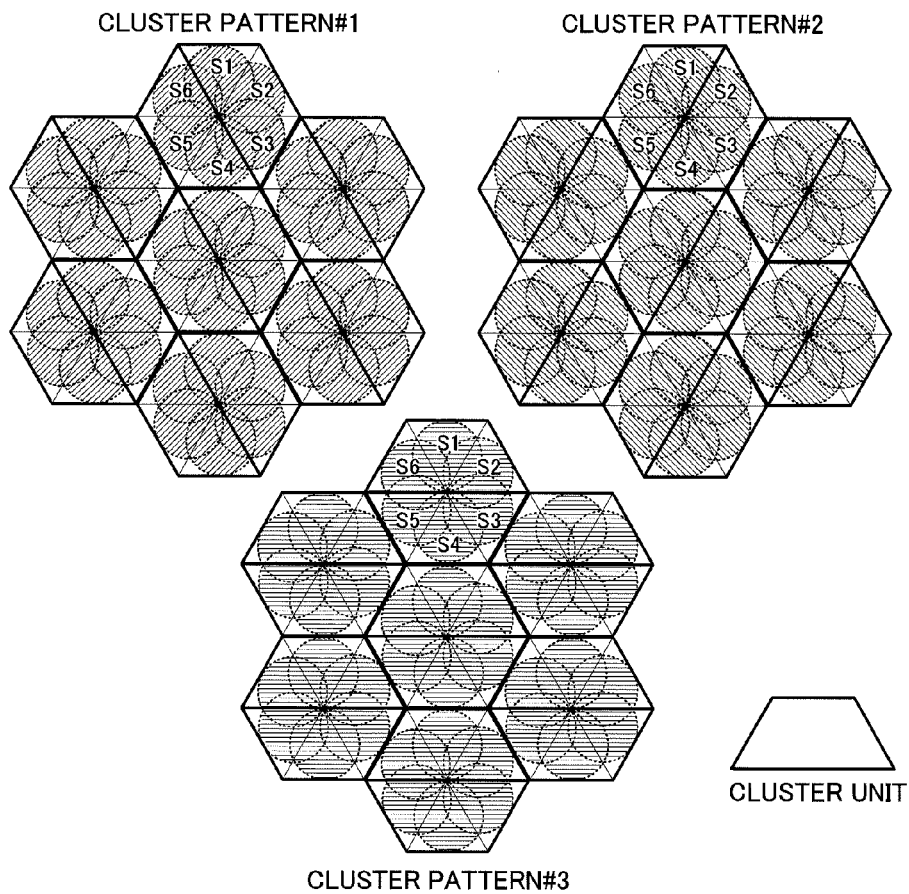
FIG. 5A
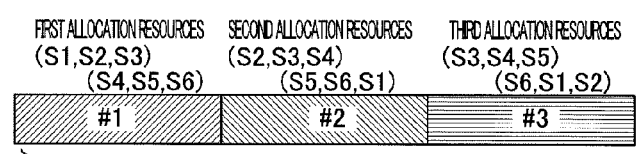
FIG. 5B
FIG. 5C

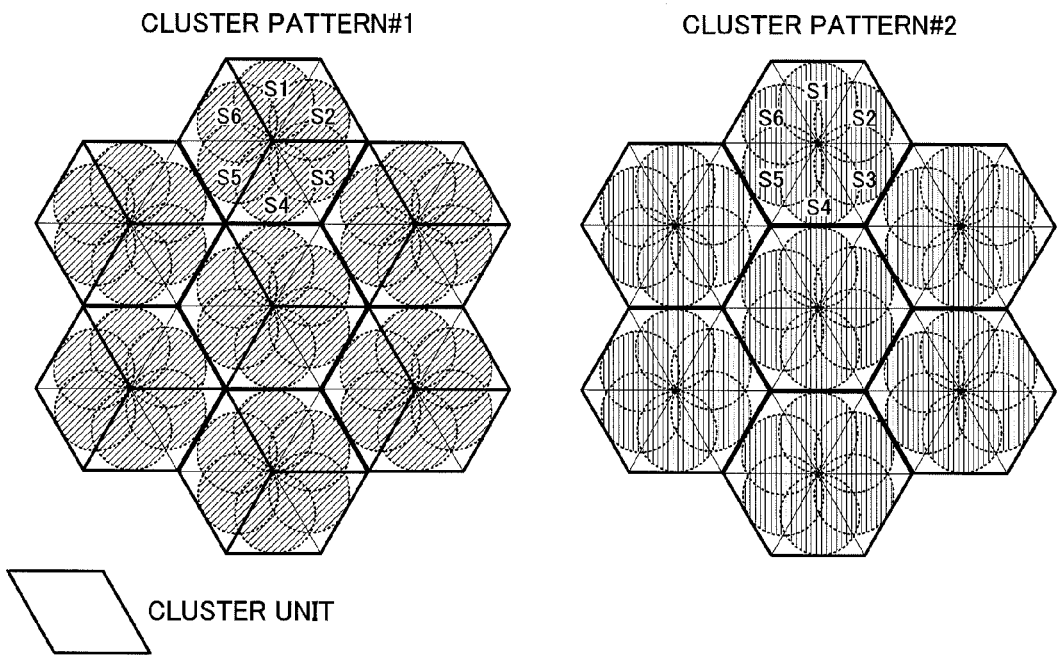
FIG. 6A
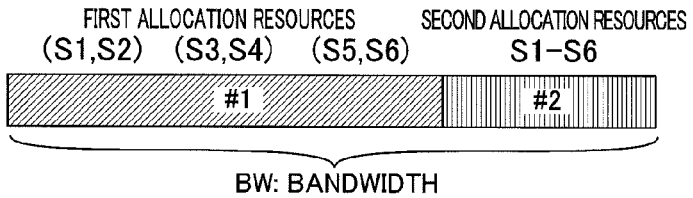
FIG. 6B
FIG. 6C

BASE STATION APPARATUS, MOBILE TERMINAL APPARATUS AND SCHEDULING METHOD

TECHNICAL FIELD

The present invention relates to a base station apparatus, mobile terminal apparatus and scheduling method in the next-generation mobile communication system.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Document 1).

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). Accordingly, it is expected that such a plurality of mobile communication systems coexists in the future, and it is conceivable that configurations (base station apparatus, mobile terminal apparatus and the like) capable of supporting the plurality of systems are needed.

In downlink of the successor system (for example, LTE-A system) to LTE, studied is Coordinated Multiple Point (CoMP) transmission in which a plurality of sectors coordinates and transmits by Intra-eNB (Intra eNode B). The CoMP method is classified into JP (Joint Processing) and CS/CB (Coordinated Scheduling/Coordinated Beamforming). In JP, signals are concurrently transmitted to a mobile terminal apparatus from a plurality of areas using radio resources of the same time and the same frequency. Meanwhile, in CS/CB, a signal is transmitted to a mobile terminal apparatus from one area using a certain subframe, and scheduling and beamforming is performed so as to reduce interference to mobile terminals in the other areas.

CITATION LIST

Non-Patent Literature

[Non-Patent Literature 1] 3GPP, TR25.912 (V7.1.0), "Feasibility study for Evolved UTRA and UTRAN", September 2006

SUMMARY OF THE INVENTION

Technical Problem

By coordinating sectors by Intra-eNB CoMP to improve throughput of a user on the border between sectors, fairness is enhanced in between users in the center of the sector and users on the border between sectors, but further improvements (reductions of the difference in throughput characteristics between users) are required in fairness of user throughput.

The present invention was made in view of such a respect, and it is an object to the invention to provide a base station apparatus, mobile terminal apparatus and scheduling method for enabling fairness of user throughput to be improved.

Solution to Problem

A base station apparatus of the invention is characterized by having a notification section which predefines a plurality of cluster patterns comprised of clusters formed of a plurality of adjacent sectors, allocates different (orthogonal) radio resources for each of the cluster patterns, and notifies a mobile terminal apparatus of allocation information of the radio resources (frequency•time resources) to each of the cluster patterns, a reception section that receives channel information and/or channel quality information corresponding to each of the cluster patterns for each of the radio resources from the mobile terminal apparatus, and a control section that controls allocation of the radio resources to the mobile terminal apparatus, based on the channel information and/or the channel quality information, where at least one of the cluster patterns is a coordinated cluster pattern to perform coordinated transmission between adjacent sectors in a cluster.

Technical Advantages of the Invention

According to the invention, coordinated transmission is performed among adjacent sectors by coordinated cluster patterns, it is thereby possible to improve throughput on the border between sectors, and it is thus possible to enhance fairness of user throughput of the sector center and the sector border (reduce the difference in throughput characteristics between users). Further, since different (orthogonal) radio resources are allocated for each cluster pattern, when user throughput decreases by the coordinated cluster pattern, it is possible to allocate other radio resources to the mobile terminal apparatus with another cluster pattern and to improve user throughput. Accordingly, it is possible to provide the base station apparatus, mobile terminal apparatus and scheduling method that further improve fairness of user throughput.

BRIEF DESCRIPTION OF THE DRAWINGS

FIG. 3 contains explanatory views of a cluster pattern configuration in the case of performing CoMP transmission between two adjacent sectors;

FIG. 4 contains explanatory views of a first cluster pattern configuration;

FIG. 5 contains explanatory views of a modification of the first cluster pattern configuration;

FIG. 6 contains explanatory views of a second cluster pattern configuration;

DESCRIPTION OF EMBODIMENTS

Figure 1A:
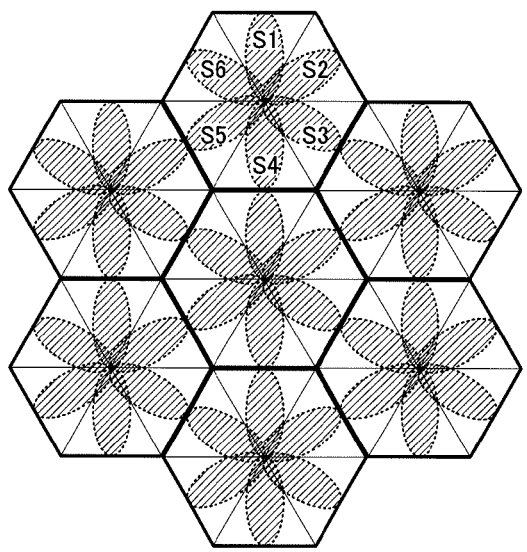
FIG. 1 contains explanatory views of a sector pattern configuration in the case of not performing CoMP transmission.
Figure 1B:
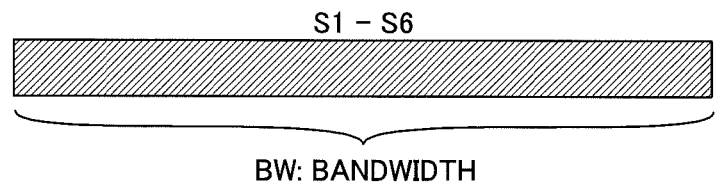

Before describing a scheduling method of the invention, described first is a sector pattern configuration in the case of not performing CoMP transmission. In addition, the following description describes a base station apparatus as a 6-sector configuration, but the sector configuration is not limited, and may be a 3-sector configuration. As shown in FIGS. 1A and 1B, the sector pattern is configured by locating a plurality of base station apparatuses (eNB) of 6-sector configuration and allocating entire radio resources to each of sectors S1 to S6.

Figure 1C:
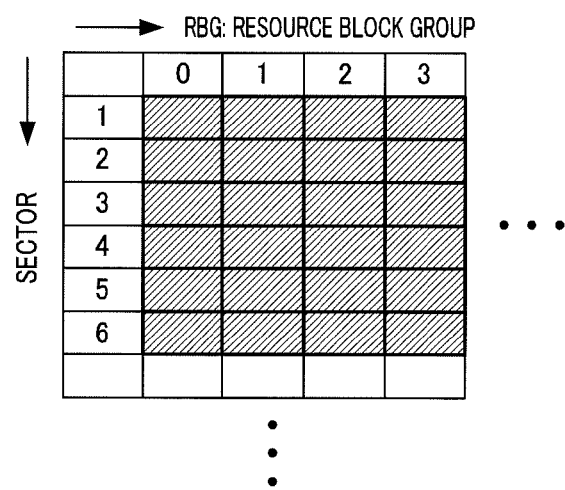

A mobile terminal apparatus measures a CQI that is reception quality (channel quality information) of a downlink channel, and channel information such as CSI (CSI: Channel State Information and PMI: Precoding Matrix Index) that is channel information, for each predetermined frequency unit to transmit to the base station apparatus as feedback. The base station apparatus allocates resources blocks to the mobile terminal apparatus based on the channel information•channel quality information, and thereby increases user throughput. However, as shown in FIG. 1C, since the entire radio resources are allocated to each sector, user throughput decreases on the sector border due to inter-sector interference.

Figure 2A:
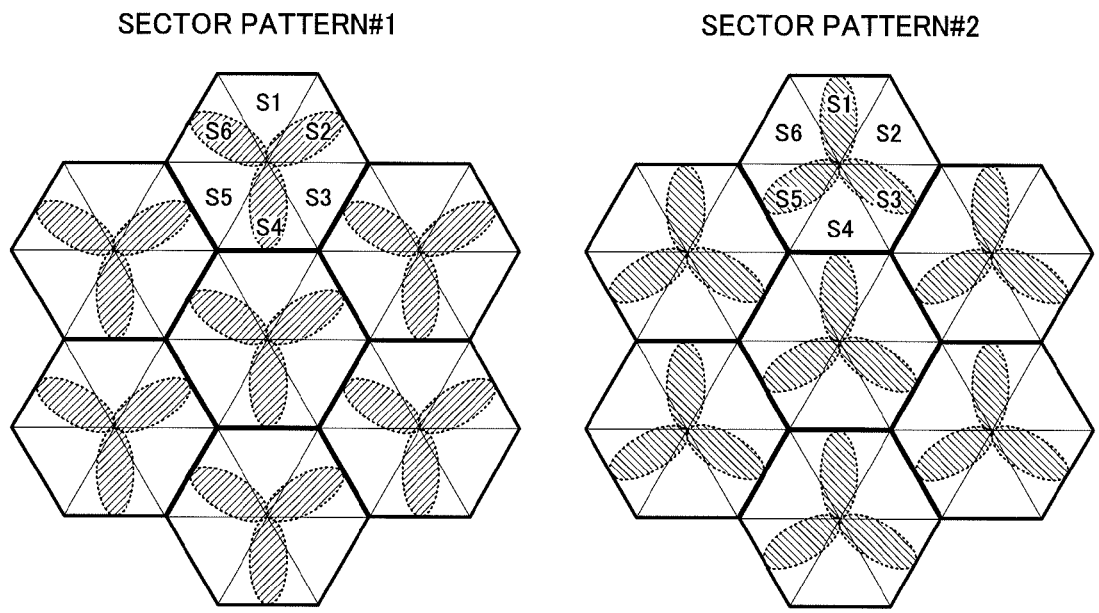
FIG. 2 contains explanatory views of another sector pattern configuration in the case of not performing CoMP transmission.
Figure 2B:
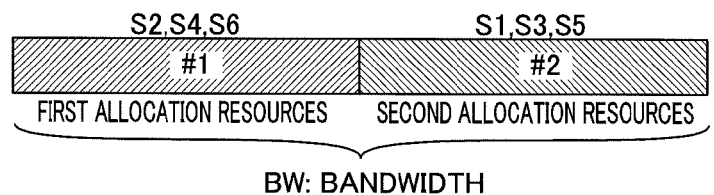

As shown in FIGS. 2A and 2B, such a configuration is considered that different radio resources are allocated to adjacent sectors to reduce inter-sector interference. In this case, first and second radio resources obtained by dividing into two are respectively allocated to two kinds of sector patterns, #1 and #2. In the sector pattern #1, first radio resources are allocated to each sector of the base station apparatus every two sectors, and in the sector pattern #2, second radio resources are allocated to sectors except the sector pattern #1. Accordingly, first and second radio resources are alternatively allocated to each sector of the base station apparatus.

Figure 2C:
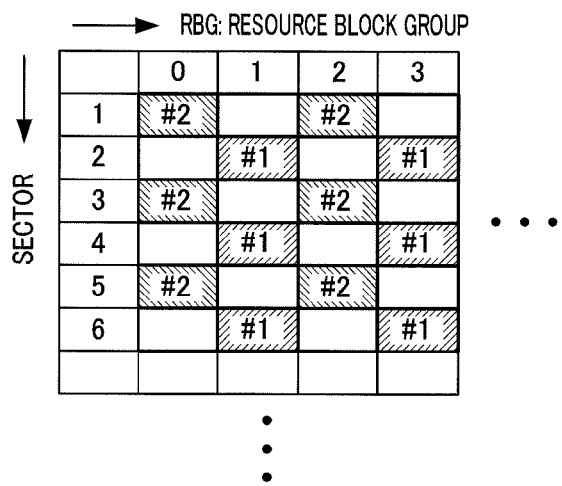

For example, first radio resources are allocated to each of sectors S2, S4 and S6, and second radio resources are allocated to each of sectors S1, S3 and S5. Thus, by allocating different radio resources between adjacent sectors, it is possible to avoid inter-sector interference. However, as shown in FIG. 2C, since the same radio resources are not disposed between adjacent sectors, radio resources available in each sector are reduced in half.

Further, as shown in FIGS. 3A and 3B, such a configuration is considered that coordinated transmission is performed between two adjacent sectors by Intra-eNB CoMP to reduce inter-sector interference. In this case, the entire radio resources are allocated to a coordinated cluster pattern #1 made a pattern with two coordinated adjacent sectors being a cluster unit. For example, the coordinated cluster pattern #1 is comprised of clusters obtained by combining adjacent sectors [S1, S2], adjacent sectors [S3, S4] and adjacent sectors [S5, S6], and the entire radio resources are allocated to each of sectors S1 to S6.

In this configuration, the coordinated effect between adjacent sectors is increased by overlap of directional beams, and user throughput on the sector border is increased. Further, as shown in FIG. 3C, since the same radio resources are disposed between adjacent sectors, radio resources available in each sector are not reduced in half. However, although user throughput on the sector border is increased, inter-cluster interference becomes a problem on the cluster border between sectors such as sectors S1 and S6. In addition, increasing the cluster unit enables inter-cluster interference to be reduced, but increases channel information that the mobile terminal apparatus transmits to the base station apparatus as feedback.

Therefore, the inventors of the present invention arrived at the invention to solve the problems. In other words, it is the gist of the invention to prepare a plurality of cluster patterns including at least a coordinated cluster pattern, allocate different radio resources to each cluster pattern, and thereby allocate radio resources to a mobile terminal apparatus suitably. Adjacent sectors are caused to perform coordinated transmission by the coordinated cluster pattern, throughput on the sector border is improved, and it is thereby possible to enhance fairness of user throughput of the sector center and sector border (reduce the difference in throughput characteristics between users). Further, when user throughput is decreased by the coordinated cluster pattern, by allocating other radio resources to the mobile terminal apparatus with another cluster pattern, it is possible to improve user throughput.

Cluster pattern configurations according to an Embodiment of the invention will be described with reference to FIGS. 4 to 10. First, a first cluster pattern configuration will be described with reference to FIG. 4. FIG. 4 contains explanatory views of the first cluster pattern configuration. The first cluster pattern configuration is to use several kinds of coordinated cluster patterns separately, and thereby reduce inter-cluster interference.

As shown in FIGS. 4A and 4B, the first cluster pattern configuration is configured by allocating different radio resources to coordinated cluster patterns #1 and #2. The coordinated cluster pattern #1 is made a pattern with two coordinated adjacent sectors being a cluster unit, and the coordinated cluster pattern #2 is made a pattern by changing combinations of adjacent sectors from the cluster pattern #1. Two kinds of coordinated cluster patterns, #1 and #2, are assigned first and second radio resources obtained by dividing into two.

For example, in the coordinated cluster pattern #1, clusters are made by clockwise combinations of adjacent sectors [S1, S2], adjacent sectors [S3, S4] and adjacent sectors [S5, S6], and the first radio resources are allocated to each sector. In the coordinated cluster pattern #2, clusters are made by counterclockwise combinations of adjacent sectors [S1, S6], adjacent sectors [S5, S4] and adjacent sectors [S3, S2], and the second radio resources are allocated to each sector.

Each sector coordinates with one of adjacent sectors by the coordinated cluster pattern #1 in the first radio resources, while coordinating with the other one of adjacent sectors by the coordinated cluster pattern #2 in the second radio resources. Accordingly, in each of the first and second radio resources, the coordinated effect between adjacent sectors of each cluster is increased by overlap of directional beams, and user throughput on the sector border is increased. Further, as shown in FIG. 4C, since the same radio resources are allocated between adjacent sectors, radio resources available in each sector are not reduced in half.

Further, inter-cluster interference on the cluster border is also reduced by suitable allocation of radio resources to users. For example, the sector border between sectors S6 and S1 is the cluster border in the coordinated cluster pattern #1, and inter-cluster interference occurs. Meanwhile, the sector border is a coordinated area in the coordinated cluster pattern #2, and inter-cluster interference is suppressed. Therefore, in users on the sector border between sectors S6 and S1, user throughput is improved by allocation of the second radio resources.

The mobile terminal apparatus measures channel information•channel quality information such as PMI and CQI in a predetermined resource unit to transmit to the base station apparatus as feedback. Based on the channel information•channel quality information, the base station apparatus allocates resource blocks to the mobile terminal apparatus. More specifically, since the channel quality is higher in the second radio resources than in the first radio resources on the sector border between sectors S6 and S1, resource blocks of the second radio resources are allocated to the mobile terminal apparatus.

Meanwhile, since the channel quality is higher in the first radio resources than in the second radio resources on the sector border between sectors S1 and S2, resource blocks of the first radio resources are allocated to the mobile terminal apparatus. Thus, by allocation of radio resources with cluster interference avoided, it is possible to further improve fairness of user throughput in the sector center and sector border (reduce the difference in throughput characteristics between users). The first cluster pattern configuration is the configuration using two kinds of coordinated cluster patterns, #1 and #2, and it is also possible to use three kinds of coordinated cluster patterns or more.

In this case, as shown in FIGS. 5A and 5B, such a configuration may be adopted that different radio resources are allocated to coordinated cluster patterns #1 to #3. Each of the coordinated cluster patterns #1 to #3 is made a pattern by changing combinations of adjacent sectors with three coordinated adjacent sectors being a cluster unit. Three kinds of coordinated cluster patterns, #1 to #3, are assigned first, second and third radio resources obtained by dividing into three.

For example, in the coordinated cluster pattern #1, clusters are made by combinations of adjacent sectors [S1, S2, S3] and adjacent sectors [S4, S5, S6], and the first radio resources are allocated to each sector. In the coordinated cluster pattern #2, clusters are made by combinations of adjacent sectors [S2, S3, S4] and adjacent sectors [S5, S6, S1], and the second radio resources are allocated to each sector. In the coordinated cluster pattern #3, clusters are made by combinations of adjacent sectors [S3, S4, S5] and adjacent sectors [S6, S1, S2], and the third radio resources are allocated to each sector.

Also in such a configuration, the coordinated effect between adjacent sectors of each cluster is increased by overlap of directional beams, and user throughput on the sector border is increased. Further, as shown in FIG. 5C, since the same radio resources are disposed between adjacent sectors, radio resources available in each sector are not reduced in half. Furthermore, by suitable allocation of radio resources to users, inter-cluster interference on the cluster border is also reduced.

Each of radio resources is not limited to the configuration for dividing the entire radio resources into equal parts, and may be of a configuration for dividing by a ratio in accordance with the user distribution and/or service requirement conditions. Further, the radio resources for each cluster pattern may be allocated in the frequency-axis direction or time-axis direction corresponding to the system form, or may be allocated in combination in the frequency-axis direction and time-axis direction.

A second cluster pattern configuration will be described with reference to FIG. 6. FIG. 6 contains explanatory views of the second cluster pattern configuration. The second cluster pattern configuration is to use a coordinated cluster pattern and non-coordinated cluster pattern separately, and thereby suppress reductions in user throughput in the sector center caused by increases in the directional beam width by coordinated transmission.

As shown in FIGS. 6A and 6B, the second cluster pattern configuration is configured by allocating different radio resources to a coordinated cluster pattern #1 and a non-coordinated cluster pattern #2 without coordination between adjacent sectors. The coordinated cluster pattern #1 is made a pattern with two coordinated adjacent sectors being a cluster unit, and the non-coordinated cluster pattern #2 is made a pattern with six non-coordinated sectors being a cluster unit.

The coordinated cluster pattern #1 is assigned first radio resources occupying a large proportion in the entire radio resources that are divided into two by a predetermined ratio. The non-coordinated cluster pattern #2 is assigned second radio resources occupying a small proportion in the entire radio resources that are divided into two by a predetermined ratio. For example, in the coordinated cluster pattern #1, clusters are made by clockwise combinations of adjacent sectors [S1, S2], adjacent sectors [S3, S4] and adjacent sectors [S5, S6], and the first radio resources are allocated to each sector. In the non-coordinated cluster pattern #2, the second radio resources are allocated to each of the sectors S1 to S6.

Each sector coordinates with one of adjacent sectors by the coordinated cluster pattern #1 in the first radio resources, and does not coordinate with the adjacent sectors by the non-coordinated cluster pattern #2 in the second radio resources. Accordingly, in the first radio resources, the coordinated effect between adjacent sectors of each cluster is increased by overlap of directional beams, and user throughput on the sector border is increased. Further, as shown in FIG. 6C, since the same radio resources are allocated between adjacent sectors, radio resources available in each sector are not reduced in half.

Further, in the second radio resources, reductions in user throughput in the sector center caused by increases in the directional beam width are suppressed. For example, in the center of the sector S1, transmission power decreases due to increases in the directional beam width in the coordinated cluster pattern #1, but does not decrease in the non-coordinated cluster pattern #2 because coordinated transmission is not performed. Therefore, user throughput is improved in the center of the sector S1 by allocation of the second radio resources.

The mobile terminal apparatus measures channel information•channel quality information such as PMI and CQI in a predetermined resource unit to transmit to the base station apparatus as feedback. Based on the channel information·channel quality information, the base station apparatus allocates resource blocks to the mobile terminal apparatus. More specifically, since the channel quality is higher in the first radio resources than in the second radio resources on the sector border between sectors S1 and S2, resource blocks of the first radio resources are allocated to the mobile terminal apparatus.

Meanwhile, since the channel quality is higher in the second radio resources than in the first radio resources in the sector center of the sector S1, resource blocks of the second radio resources are allocated to the mobile terminal apparatus. Thus, by suitable allocation of radio resources, it is possible to suppress decreases in transmission power in the sector center caused by coordinated transmission, and further improve fairness of user throughput in the sector center and sector border (reduce the difference in throughput characteristics between users). In the second cluster pattern configuration, such a configuration is adopted that average transmission power of the first and second radio resources are equal, but average transmission power of the first and second radio resources may be different.

Figure 7:
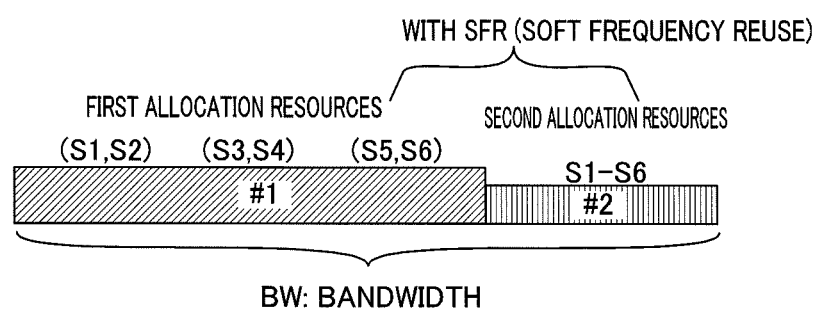
FIG. 7 is an explanatory view of a modification of the second cluster pattern configuration.

In this case, as shown in FIG. 7, average transmission power of the second radio resources may be set to be lower than average transmission power of the first radio resources. The first radio resources are preferentially allocated to mobile terminal apparatuses on the sector border, and therefore, provide a large propagation loss, but the second radio resources are preferentially allocated to mobile terminal apparatuses in the sector center, and therefore, provide a small propagation loss. Accordingly, even when average transmission power of the second radio resources is lowered, it is possible to ensure certain channel quality for mobile terminal apparatuses in the sector center. Further, it is possible to set average transmission power of the second radio resources to be higher than average transmission power of the first radio resources.

In addition, the second cluster pattern configuration is of the configuration using the coordinated cluster pattern #1 and non-coordinated cluster pattern #2, and it is also possible to use a plurality of coordinated cluster patterns and a single non-coordinated cluster pattern.

Figures 8A, 8B, 8C:
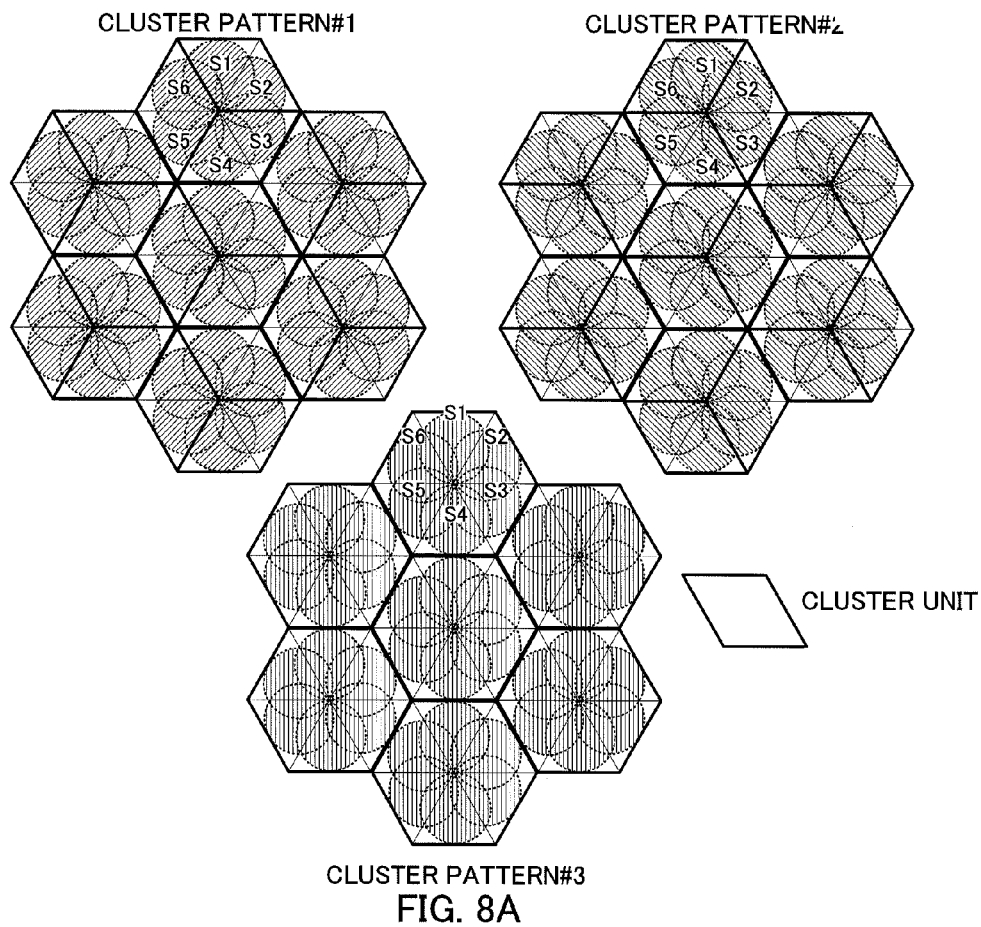
FIG. 8 contains explanatory views of another modification of the second cluster pattern configuration.

In this case, as shown in FIGS. 8A and 8B, such a configuration may be adopted that different radio resources are allocated to coordinated cluster patterns #1 and #2, and non-coordinated cluster pattern #3. Each of the coordinated cluster patterns #1 and #2 is made a pattern by changing combinations of adjacent sectors with two coordinated adjacent sectors being a cluster unit. The non-coordinated cluster pattern #3 is made a pattern with six non-coordinated sectors being a cluster unit. Each of cluster patterns #1 to #3 is respectively assigned first, second or third radio resources obtained by dividing into three.

For example, in the coordinated cluster pattern #1, clusters are made by clockwise combinations of adjacent sectors [S1, S2], adjacent sectors [S3, S4] and adjacent sectors [S5, S6], and the first radio resources are allocated to each sector. In the coordinated cluster pattern #2, clusters are made by counterclockwise combinations of adjacent sectors [S1, S6], adjacent sectors [S5, S4] and adjacent sectors [S3, S2], and the second radio resources are allocated to each sector. In the non-coordinated cluster pattern #3, the third radio resources are allocated to each of the sectors S1 to S6.

Each sector coordinates with one of adjacent sectors by the coordinated cluster pattern #1 in the first radio resources, coordinates with the other one of adjacent sectors by the coordinated cluster pattern #2 in the second radio resources, and does not coordinate with the adjacent sectors by the non-coordinated cluster pattern #3 in the third radio resources. Accordingly, in the each of the first and second radio resources, the coordinated effect between adjacent sectors of each cluster is increased by overlap of directional beams, and user throughput on the sector border is increased. In the third radio resources, reductions in user throughput in the sector center caused by increases in the directional beam width are suppressed.

For example, the sector border between sectors S6 and S1 is the cluster border in the coordinated cluster pattern #1, and inter-cluster interference occurs. Meanwhile, the sector border is a coordinated area in the coordinated cluster pattern #2, and inter-cluster interference is suppressed. Therefore, on the sector border between sectors S6 and S1, user throughput is improved by allocation of the second radio resources. The sector border between sectors S1 and S2 is the cluster border in the coordinated cluster pattern #2, and inter-cluster interference occurs. Meanwhile, the sector border is a coordinated area in the coordinated cluster pattern #1, and inter-cluster interference is suppressed. Therefore, on the sector border between sectors S1 and S2, user throughput is improved by allocation of the first radio resources.

Further, in the center of the sector S1, transmission power decreases due to increases in the directional beam width in the coordinated cluster patterns #1 and #2, but does not decrease in the non-coordinated cluster pattern #3 because coordinated transmission is not performed. Therefore, user throughput is improved in the center of the sector S1 by allocation of the third radio resources. Furthermore, as shown in FIG. 8C, since the same radio resources are allocated between adjacent sectors, radio resources available in each sector are not reduced in half. In addition, average transmission power of the first, second and third radio resources may be different, and average transmission power of the third radio resources may be set to be lower than average transmission power of the first and second radio resources.

Each of radio resources is not limited to the configuration for dividing the entire radio resources into equal parts, and may be of a configuration for dividing by a ratio in accordance with the user distribution and/or service requirement conditions. Further, the radio resources for each cluster pattern may be allocated in the frequency-axis direction or time-axis direction corresponding to the system form, or may be allocated in combination in the frequency-axis direction and time-axis direction.

Figure 9A:
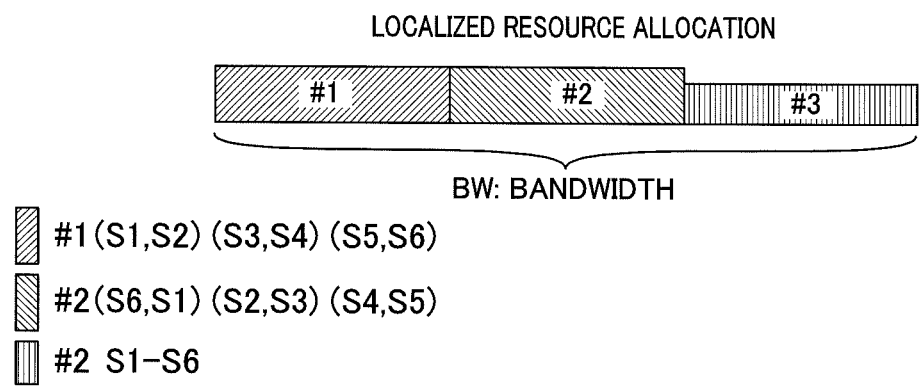
FIG. 9 contains explanatory views of allocation of radio resources to cluster patterns.
Figure 9B:
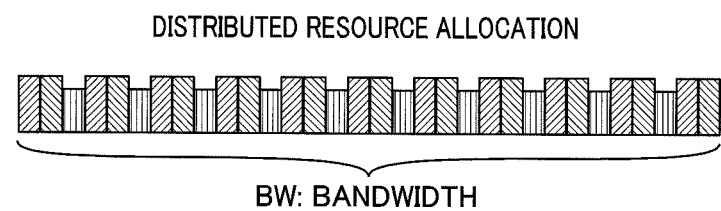

In the first and second cluster pattern configurations, in the case of fixed allocation of radio resources to the cluster patterns, the allocation may be localized resource allocation as shown in FIG. 9A, or may be distributed resource allocation as shown in FIG. 9B. It is essential only that localized resource allocation is consecutive resource allocation, and the allocation may be performed for each predetermined system band such as a component carrier that is one unit of carrier aggregation. It is essential only that distributed resource allocation is discrete resource allocation, and the allocation may be performed for resource block.

Figures 10A, 10B:
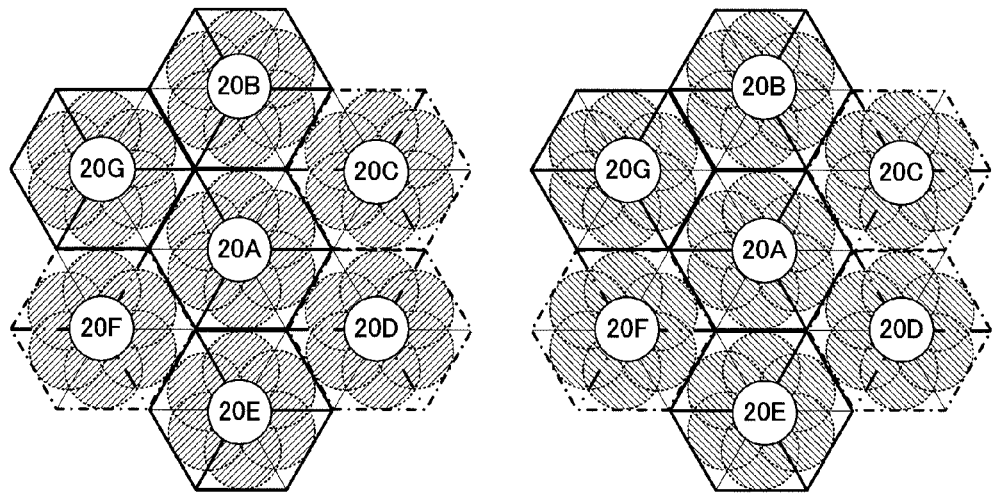
FIG. 10 contains explanatory views of individual cluster pattern configurations for each base station apparatus.

Further, as shown in FIG. 10A, radio resources may be allocated to each cluster pattern individually among a plurality of adjacent base station apparatuses. For example, the coordinated cluster patterns #1 and #2, which are made patterns by changing combinations of adjacent sectors as shown in FIG. 4 with two coordinated adjacent sectors being a cluster unit, are applied to a plurality of base station apparatuses 20A to 20G. As shown in FIG. 10B, in the base station apparatuses 20A, 20B, 20E and 20G, the coordinated cluster pattern #1 is assigned the second radio resources, and the coordinated cluster pattern #2 is assigned the first radio resources. In the base station apparatuses 20C, 20D, and 20F, the coordinated cluster pattern #1 is assigned the first radio resources, and the coordinated cluster pattern #2 is assigned the second radio resources.

In the example as shown in FIG. 10A, in the first radio resources, the base station apparatuses 20A, 20B, 20E and 20G are set for the coordinated cluster pattern #1, and the base station apparatuses 20C, 20D, and 20F are set for the coordinated cluster pattern #2. In the second radio resources, the base station apparatuses 20A, 20B, 20E and 20G are set for the coordinated cluster pattern #2, and the base station apparatuses 20C, 20D, and 20F are set for the coordinated cluster pattern #1. It may be configured that different cluster patterns are thus applied for each of adjacent base station apparatuses 20.

In scheduling according to the invention, radio resources may be allocated to cluster patterns fixedly or dynamically. In fixed allocation of radio resources, radio resources are allocated fixedly to each cluster pattern at a beforehand determined ratio. In scheduling using fixed allocation, the base station apparatus notifies the mobile terminal apparatus of allocation information of radio resources to cluster patterns in the initial processing, and the mobile terminal apparatus measures the channel information•channel quality information in accordance with the cluster pattern in each resource. The base station apparatus allocates suitable resources to the mobile terminal apparatus based on the channel information•channel quality information transmitted from the mobile terminal apparatus as feedback.

In dynamic allocation of radio resources, radio resources are allocated dynamically to each cluster pattern corresponding to system status such as the user distribution. In scheduling using dynamic allocation, the base station apparatus notifies the mobile terminal apparatus of all cluster patterns that are candidates for allocation of each resource, and the mobile terminal apparatus measures the channel information•channel quality information corresponding to all cluster patterns in each resource. Based on the channel information•channel quality information transmitted from the mobile terminal apparatus as feedback, the base station apparatus determines the best cluster pattern to each resource, and allocates suitable resources to the mobile terminal apparatus. In addition, details will be described later on the fixed allocation processing and dynamic allocation processing of radio resources to cluster patterns.

Figure 11:
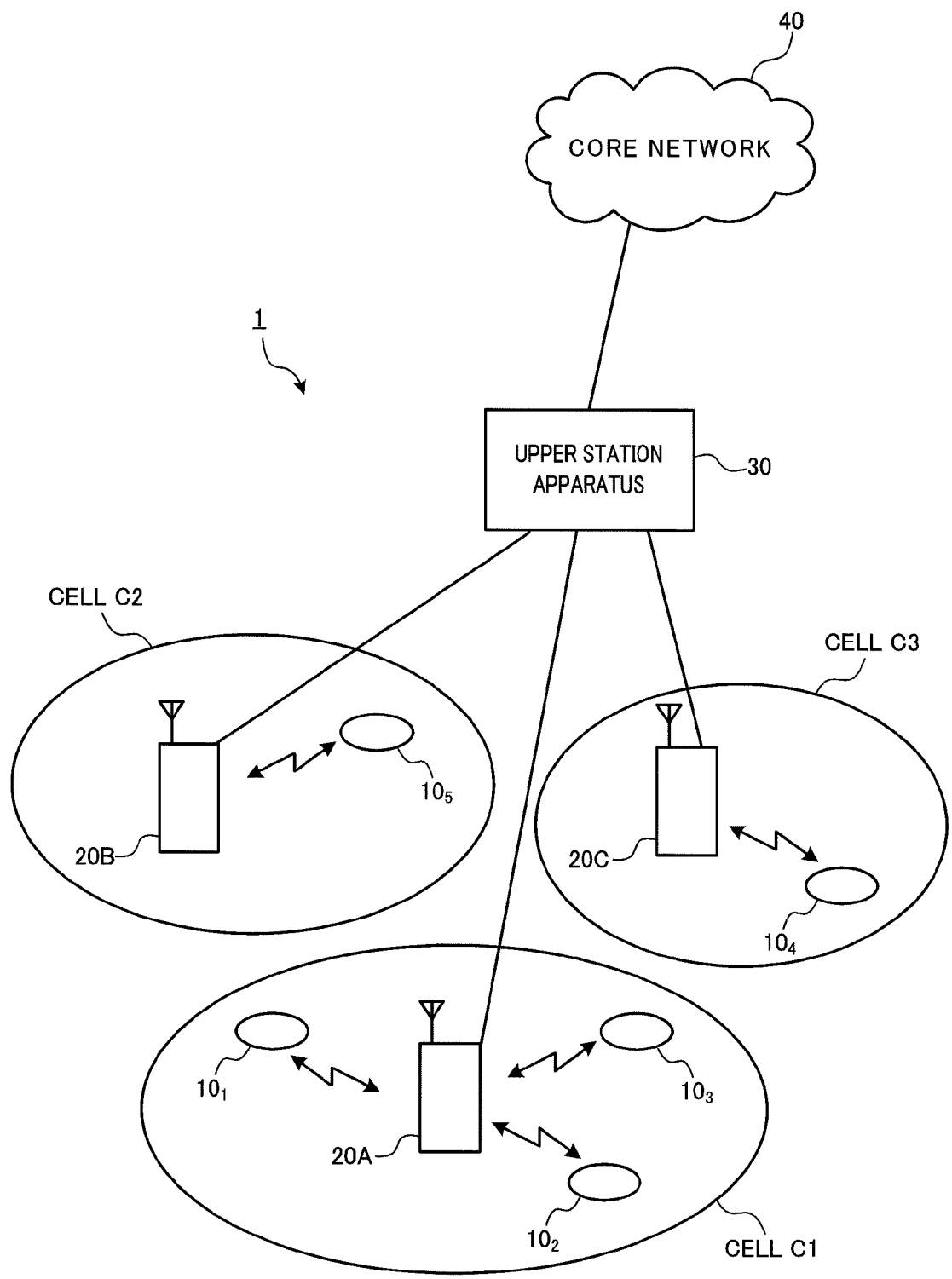
FIG. 11 is an explanatory view of a system configuration of a radio communication system.

A radio communication system according to the Embodiment of the invention will specifically be described herein. FIG. 11 is an explanatory view of a system configuration of the radio communication system according to this Embodiment. In addition, the radio communication system as shown in FIG. 11 is a system including the LTE system or SUPER 3G, for example. In the radio communication system is used carrier aggregation for integrating a plurality of base frequency blocks with the system band of the LTE system as one unit. Further, the radio communication system may be called IMT-Advanced or may be called 4G.

As shown in FIG. 11, the radio communication system 1 includes the base station apparatuses 20A, 20B and 20C and a plurality of mobile terminal apparatuses 10 ($10_1$, $10_2$, $10_3$, . . . , $10_n$, n is an integer where n>0) that communicate with the base station apparatuses 20A, 20B and 20C and is comprised thereof. The base station apparatuses 20A, 20B and 20C are connected to an upper station apparatus 30, and the upper station apparatus 30 is connected to a core network 40. The mobile terminal apparatuses 10 are capable of communicating with the base station apparatuses 20A, 20B and 20C in cells C1, C2 and C3, respectively. In addition, for example, the upper station apparatus 30 includes an access gateway apparatus, radio network controller (RNC), mobility management entity (MME), etc., but is not limited thereto.

Each of the mobile terminal apparatuses ($10_1$, $10_2$, $10_3$, . . . , $10_n$) includes an LTE terminal and LTE-A terminal, and is described as a mobile terminal apparatus 10 unless otherwise specified in the following description. Further, for convenience in description, the description is given while assuming that equipment that performs radio communications with the base station apparatuses 20A, 20B and 20C is the mobile terminal apparatus 10, and more generally, the equipment may be user equipment (UE) including mobile terminal apparatuses and fixed terminal apparatuses.

In the radio communication system 1, as a radio access scheme, OFDMA (Orthogonal Frequency Division Multiple Access) is applied in downlink, while SC-FDMA (Single-Carrier Frequency Division Multiple Access) is applied in uplink, but the uplink radio access scheme is not limited thereto. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. The downlink communication channels have the PDSCH (Physical Downlink Shared Channel) as a downlink data channel shared among the mobile terminal apparatuses 10, and downlink L1/L2 control channels (PDCCH, PCFICH, PHICH). Transmission data and higher control information is transmitted on the PDSCH. Scheduling information of the PDSCH and PUSCH and the like is transmitted on the PDCCH (Physical Downlink Control Channel). The number of OFDM symbols used in the PDCCH is transmitted on the PCFICH (Physical Control Format Indicator Channel). ACK/NACK of HARQ for the PUSCH is transmitted on the PHICH (Physical Hybrid-ARQ Indicator Channel).

The uplink control channels have the PUSCH (Physical Uplink Shared Channel) as an uplink data channel shared among the mobile terminal apparatuses, and the PUCCH (Physical Uplink Control Channel) that is a control channel in uplink. Transmission data and higher control information is transmitted on the PUSCH. Further, on the PUCCH is transmitted downlink radio quality information (CQI: Channel Quality Indicator), ACK/NACK and the like.

Figure 12:
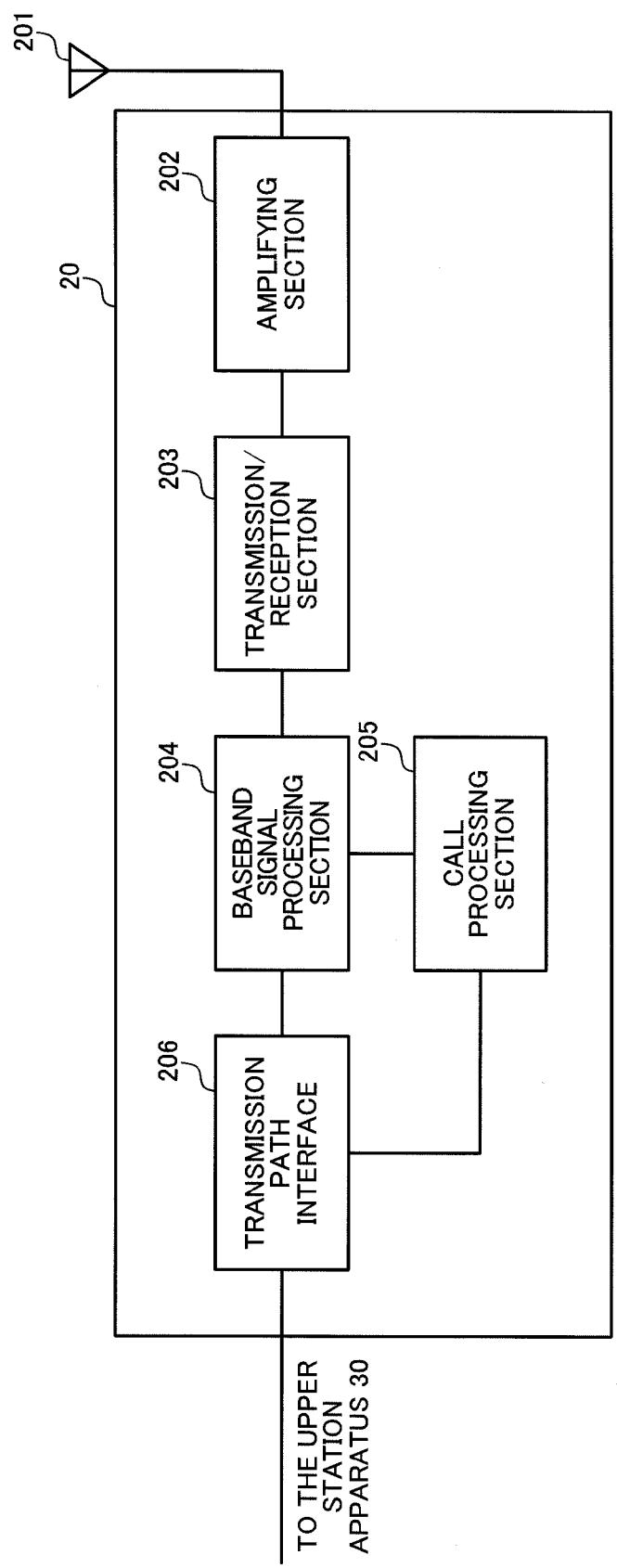
FIG. 12 is an explanatory diagram of an entire configuration of a base station apparatus.

Referring to FIG. 12, described is the entire configuration of the base station apparatus according to this Embodiment. In addition, the base station apparatuses 20A, 20B and 20C have the same configuration, and therefore, are described as the base station apparatus 20. The base station apparatus 20 is provided with a transmission/reception antenna 201, amplifying section 202, transmission/reception section (notification section, reception section) 203, baseband signal processing section 204, call processing section 205 and transmission path interface 206. The transmission data to transmit from the base station apparatus 20 to the mobile terminal apparatus 10 in downlink is input to the baseband signal processing section 204 via the transmission path interface 206 from the upper station apparatus 30.

The baseband signal processing section 204 performs, to the downlink data channel signal, PDCP layer processing, segmentation and concatenation of the transmission data, RLC (Radio Link Control) layer transmission processing such as transmission processing of RLC retransmission control, MAC (Medium Access Control) retransmission control e.g. HARQ transmission processing, scheduling, transmission format selection, channel coding, Inverse Fast Fourier Transform (IFFT) processing and precoding processing. Further, on a signal of the Physical Downlink Control Channel that is a downlink control channel, the section 204 also performs transmission processing of channel coding, IFFT and the like.

Further, the baseband signal processing section 204 notifies mobile terminal apparatuses 10 connected to the same cell of control information for each mobile terminal apparatus 10 to perform radio communications with the base station apparatus 20 on the broadcast channel. For example, the broadcast information for communications in the cell includes the system bandwidth in uplink or downlink, identification information (Root Sequence Index) of a root sequence to generate a signal of a random access preamble on the PRACH (Physical Random Access Channel), etc.

The transmission/reception section 203 converts the frequency of the baseband signal output from the baseband signal processing section 204 into a radio frequency band. The amplifying section 202 amplifies a transmission signal subjected to frequency conversion to output to the transmission/reception antenna 201.

Meanwhile, with respect to signals transmitted from the mobile terminal apparatus 10 to the base station apparatus 20 in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT processing, IDFT processing, error correcting decoding, reception processing of MAC retransmission control, and reception processing of RLC layer and PDCP layer to the transmission data included in the baseband signal received in uplink. The decoded signal is transferred to the upper station apparatus 30 via the transmission path interface 206.

The call processing section 205 performs call processing such as setting and release of the communication channel, status management of the base station apparatus 20, and management of radio resources.

Figure 13:
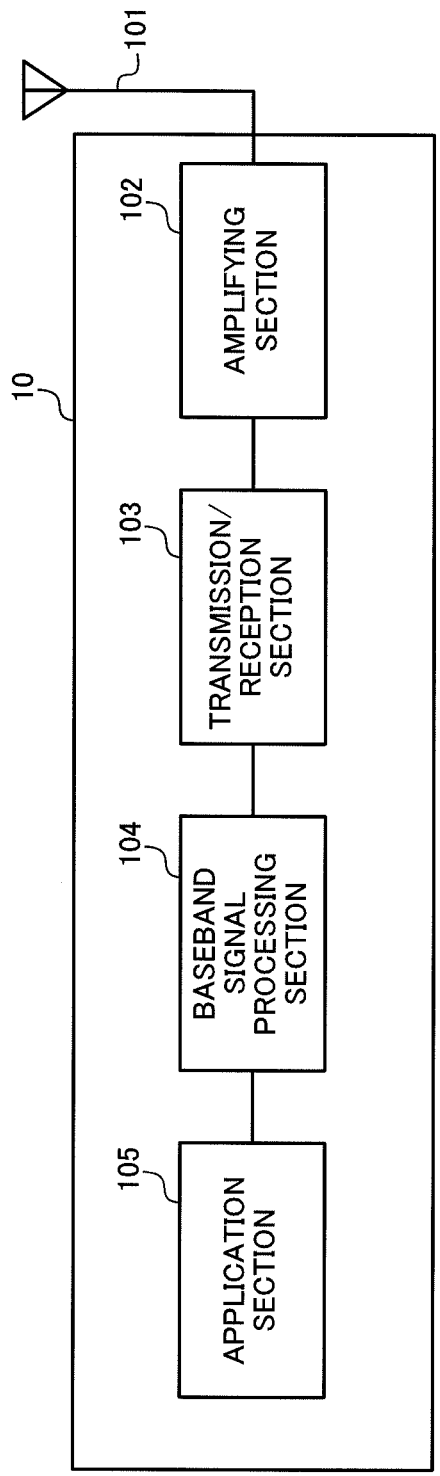
FIG. 13 is an explanatory diagram of an entire configuration of a mobile terminal apparatus.

Referring to FIG. 13, described next is the entire configuration of the mobile terminal apparatus according to this Embodiment. The LTE terminal and the LTE-A terminal have the same configuration of principal part of hardware, and are not distinguished to describe. The mobile terminal apparatus 10 is provided with a transmission/reception antenna 101, amplifying section 102, transmission/reception section (reception section) 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, the transmission data in downlink is transferred to the application section 105. The application section 105 performs processing concerning layers higher than the physical layer and MAC layer and the like. Further, among the data in downlink, the broadcast information is also transferred to the application section 105.

Meanwhile, with respect to transmission data in uplink, the application section 105 inputs the data to the baseband signal processing section 104. The baseband signal processing section 104 performs mapping processing, transmission processing of retransmission control (HARQ), channel coding, DFT processing and IFFT processing. The transmission/reception section 103 converts the frequency of the baseband signal output from the baseband signal processing section 104 into a radio frequency band. Then, the signal is amplified in the amplifying section 102, and is transmitted from the transmission/reception antenna 101.

Figure 14:
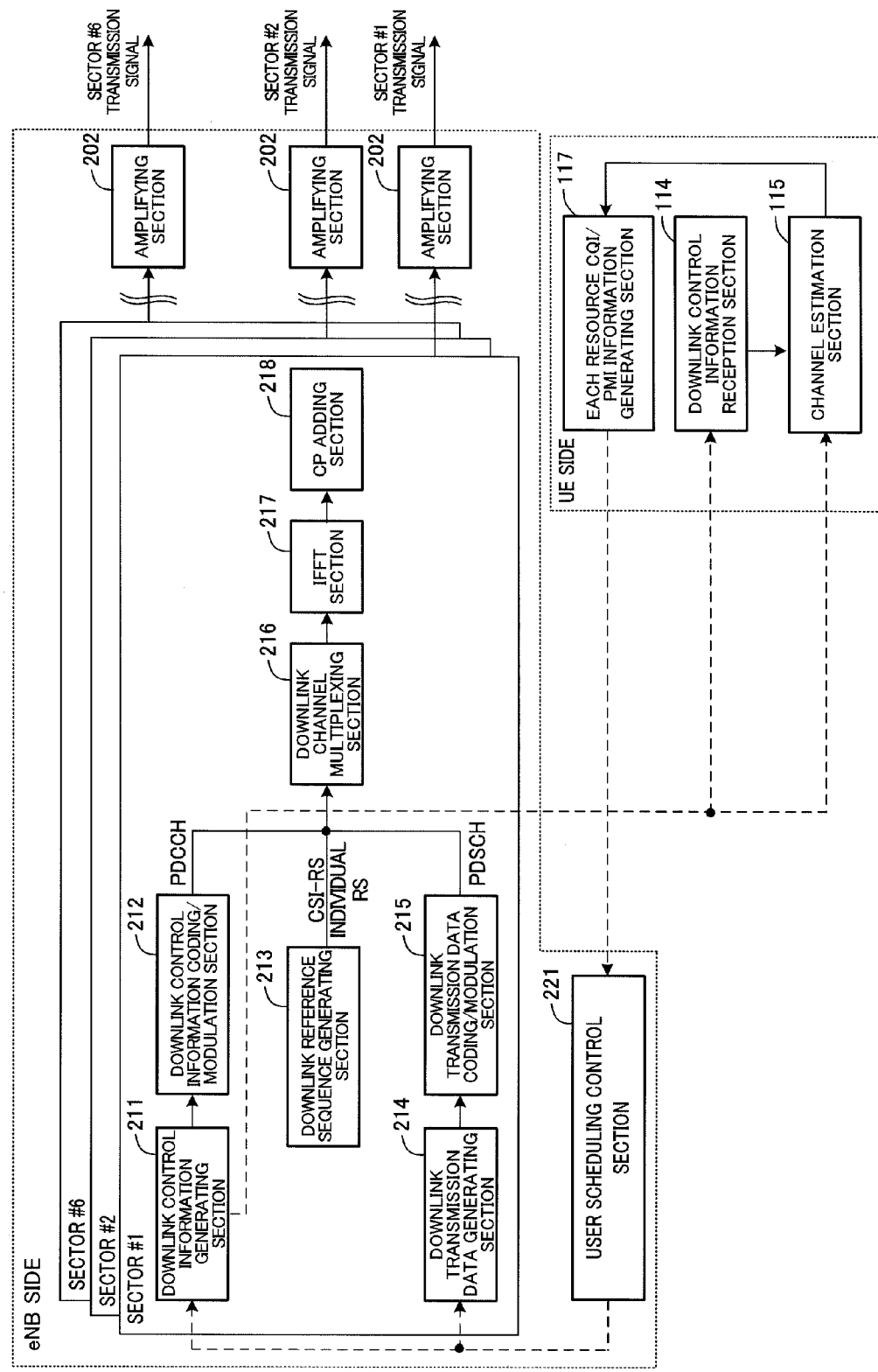
FIG. 14 is a functional block diagram for the base station apparatus to perform scheduling processing of fixed allocation.

The scheduling processing of fixed allocation and scheduling processing of dynamic allocation will specifically be described below. Functional blocks for the scheduling processing of fixed allocation by the base station apparatus will be described with reference to FIG. 14. The functional blocks as shown in FIG. 14 are mainly of processing content of the baseband processing section. In addition, in FIG. 14, for convenience in description, the description is given while including a part of functional blocks of the mobile terminal apparatus.

As shown in FIG. 14, in response to each of sectors #1 to #6, the base station apparatus 20 has downlink control information generating sections 211, downlink control information coding/modulation sections 212, downlink reference sequence generating sections 213, downlink transmission data generating sections 214, downlink transmission data coding/modulation sections 215, downlink channel multiplexing sections 216, IFFT sections 217, CP adding sections 218, and amplifying sections 202. Further, the base station apparatus 20 has a user scheduling control section 221.

The downlink control information generating section 211 generates downlink control information (PDCCH) including allocation information for beforehand allocating radio resources fixedly to each cluster pattern. As well as the allocation information, the downlink control information includes scheduling information of the PDSCH and PUSCH and format information of the modulation method, channel coding rate and the like. The downlink control information coding/modulation section 212 codes and modulates the downlink control information output from the downlink control information generating section 211 for each user. The downlink control information output from the downlink control information coding/modulation section 212 is input to the downlink channel multiplexing section 216.

The downlink reference sequence generating section 213 generates reference signals (CSI-RS, individual RS) for CQI (Channel Quality Indicator) measurement. The reference signal generated in the downlink reference sequence generating section 213 is input to the downlink channel multiplexing section 216. The downlink transmission data generating section 214 generates downlink transmission data (PDSCH) based on scheduling by the user scheduling control section 221. Further, the downlink transmission data generating section 214 controls average transmission power with a transmission power control section under control thereof. The downlink transmission data coding/modulation section 215 codes and modulates the downlink transmission data output from the downlink transmission data generating section 214 for each user. The downlink transmission data output from the downlink transmission data coding/modulation section 215 is input to the downlink channel multiplexing section 216.

The downlink control information, reference signal and downlink transmission data is channel-multiplexed in the downlink channel multiplexing section 216, undergoes processing such as interleaving, and then, is input to the IFFT section 217 as a downlink transmission signal. The IFFT section 217 performs Inverse Fast Fourier Transform (IFFT) to the downlink transmission signal, and transforms the signal of frequency waveform into the signal of time waveform. The CP adding section 218 adds a cyclic prefix to the signal of time waveform. The downlink transmission signal given the cyclic prefix is transmitted via the amplifying section 202.

The allocation information notified to the mobile terminal apparatus 10 via the downlink transmission signal is used in change of reception format and channel estimation. Based on the allocation information, the mobile terminal apparatus 10 identifies the cluster pattern beforehand assigned radio resources, and changes to a reception format corresponding to the cluster pattern. The mobile terminal apparatus 10 performs channel estimation for each resource block in accordance with the cluster pattern, and transmits CQI/PMI information and the like for each resource block to the base station apparatus 20 as the channel quality information•channel information as feedback. Hereinafter, the description is given using feedback of CQI and PMI as the channel quality information•channel information as an example, and the channel quality information•channel information other than CQI and PMI may be used. Further, in the following description, the description of channel information•channel quality information indicates both or either of the channel information and channel quality information. For example, in a system of single antenna to which MIMO (Multiple Input Multiple Output) is not applied, only the channel information is transmitted from the mobile terminal apparatus 10 to the base station apparatus 20 as feedback.

The user scheduling control section 221 performs scheduling of uplink and downlink control information and uplink and downlink transmission data. In the transmission path in mobile communications, user throughput varies with each resource due to inter-sector interference, inter-cluster interference and the like. Therefore, the user scheduling control section 221 allocates resource blocks of good communication quality to each mobile terminal apparatus 10 for each subframe in transmitting the downlink transmission data to the mobile terminal apparatus 10.

At this point, the user scheduling control section 221 acquires the channel information channel quality information transmitted from the mobile terminal apparatus 10 as feedback, for resource blocks that are fixedly allocated to each cluster pattern. Then, the user scheduling control section 221 allocates resource blocks to the mobile terminal apparatus 10 so as to maximize the beforehand defined objective function. In addition, as maximization of the objective function, used are Minimum rate maximization for maximizing a minimum rate among all users, Proportional fairness maximization for maximizing an instantaneous rate R(i) of each user normalized by Avg(R_achieved) that is an average value of rates R_achieved that the user achieves previously (some previous time window), and the like.

Minimum-Rate Maximization

It means increasing the capacity of a user that is the lowest channel capacity among all users to a maximum extent. By this means, it is possible to reduce differences between channel capacities in all users.

$$\max_{p} \min_{k} R_{k,p}(i)$$

Proportional Fairness Maximization $$\max M_{k,p}(i) = \frac{R_{k,p}(i)}{Avg\{R_{achieved}(i)\}}$$

As a theoretical value of $R_{k,p}(i)$, $$\sum_{j=1}^{M_{r,k}} \log_2(1 + SNR(i)_{k,j,p})$$

is used, and used also are a value with AMC (Adaptive Modulation & Coding) expected and the like. $SNR_{k,j,p}(i)$ is an SNR value on the reception side in a reception antenna j of a user k with some cluster pattern p assumed in a subframe i. $M_{r,k}$ represents the number of reception antennas of the user k. As the SNR used in pattern selection, it is the best using the value that is calculated by the channel information•channel quality information transmitted from the user side as feedback and that undergoes transmission precoding of Intra-eNB CoMP, but as well as the SNR, calculation of other SNR may be performed.

The user scheduling control section 221 determines MCS (coding rate, modulation scheme) that meets a predetermined block error rate in the allocated resource block. The downlink control information coding/modulation sections 212 and downlink transmission data coding/modulation sections 215 are set for parameters that meet the MCS determined in the user scheduling control section 221. In addition, transmission power of each resource may be controlled by the downlink transmission data generating section 214 or the user scheduling control section 221.

Functional blocks for the scheduling processing of fixed allocation by the mobile terminal apparatus will be described with reference to FIG. 15. The functional blocks as shown in FIG. 15 are mainly of processing content of the baseband processing section.

Figure 15:
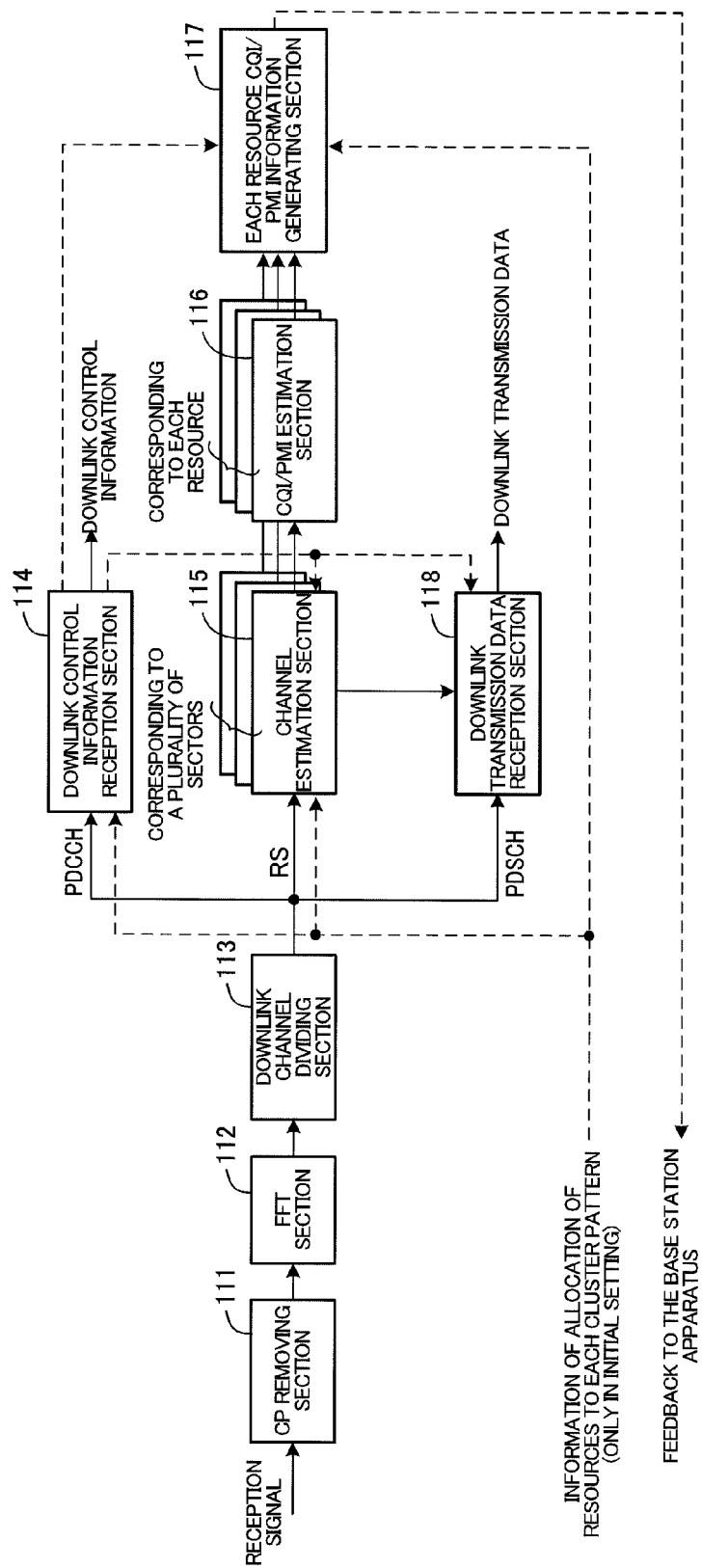
FIG. 15 is a functional block diagram for the mobile terminal apparatus to perform the scheduling processing of fixed allocation.

As shown in FIG. 15, the mobile terminal apparatus 10 has a CP removing section 111, FFT section 112, downlink channel dividing section 113, downlink control information reception section 114, channel estimation sections 115, CQI/PMI estimation sections 116, each resource CQI/PMI information generating section (channel information generating section) 117, and downlink transmission data reception section 118. The CP removing section 111 removes a cyclic prefix added to a downlink reception signal from the base station apparatus 20. The FFT section 112 performs Fast Fourier Transform (FFT) to the downlink reception signal, and transforms the signal of time waveform into the signal of frequency waveform. The reception signal output from the FFT section 112 undergoes processing such as deinterleaving, then is input to the downlink channel dividing section 113, and is divided into downlink control information, downlink reference signal and downlink transmission data.

The downlink control information reception section 114 demodulates and decodes the downlink control information, and acquires allocation information of radio resources to cluster patterns, in addition to uplink and downlink scheduling information, channel coding rate and the like. The downlink control information reception section 114 changes reception formats of the channel estimation section 115 and downlink transmission data reception section 118 in accordance with the cluster pattern, from the cluster patterns and the number of cluster patterns indicated by the allocation information.

The channel estimation section 115 obtains a channel estimation value between the transmission antenna of the base station apparatus 20 and the reception antenna of the mobile terminal apparatus 10. The channel estimation section 115 obtains the channel estimation value in accordance with the cluster pattern to which each resource is fixedly allocated. More specifically, the channel estimation section 115 obtains not only the channel estimation value of the serving sector but also the channel estimation value of the adjacent sector in the same cluster in the radio resources of the coordinated cluster pattern. Meanwhile, the channel estimation section 115 obtains the channel estimation value of the serving sector in the radio resources of the non-coordinated cluster pattern.

The channel estimation value is input to the CQI/PMI estimation section 116, and also is input to the downlink transmission data reception section 118 for demodulation of the downlink transmission data. Using the channel estimation value, the CQI/PMI estimation section 116 estimates the CQI and PMI (Precoding Matrix Indicator) for each resource block.

The each resource CQI/PMI information generating section 117 generates the CQI/PMI information for each resource block, based on the CQI estimation values and PMI estimation values output from the CQI/PMI estimation sections 116. The CQI/PMI information is transmitted to the base station apparatus 20 as feedback in accordance with the cluster pattern corresponding to each resource block. The transmission data reception section 118 demodulates and codes the downlink transmission data to acquire the downlink transmission data, based on the downlink scheduling information from the downlink control information reception section 114 and the channel estimation value from the channel estimation section 115.

Figure 16:
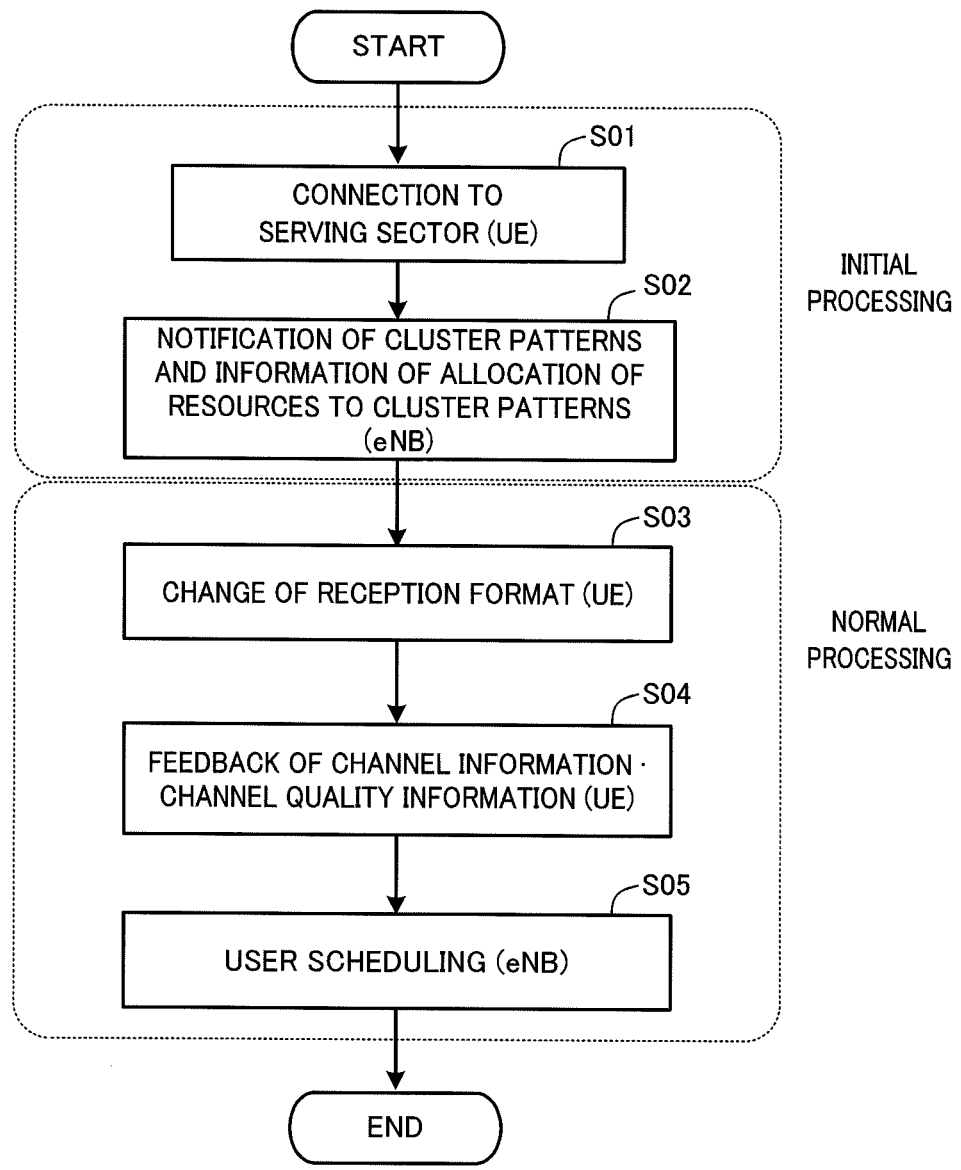
FIG. 16 is a flowchart of the scheduling processing of fixed allocation.

The entire flow of the scheduling processing of fixed allocation will be described with reference to FIG. 16. As shown in FIG. 16, as the initial processing, when the mobile terminal apparatus 10 connects to the serving sector (step S01), the base station apparatus 20 notifies the mobile terminal apparatus 10 of allocation information (step S02). In this case, the base station apparatus 20 notifies the mobile terminal apparatus 10 of the allocation information for beforehand allocating radio resources fixedly to cluster patterns. The initial processing of steps S01 and S02 is performed only in starting connection between the mobile terminal apparatus 10 and the sector.

Next, as normal processing, the mobile terminal apparatus 10 changes the reception format in accordance with the cluster pattern for each resource block (step S03), and transmits the channel information•channel quality information to the base station apparatus 20 as feedback in accordance with the cluster pattern for each resource block (step S04). Based on the feedback information from the mobile terminal apparatus 10, the base station apparatus 20 allocates resource blocks that ensure certain user throughput to the mobile terminal apparatus 10 (step S05). By this allocation of resource blocks, the cluster pattern for the mobile terminal apparatus 10 is also selected.

Thus, in the scheduling processing of fixed allocation, the normal processing is repeated after the initial processing. Accordingly, it is possible to easily control communications between the mobile terminal apparatus and the base station apparatus. Further, the base station apparatus 20 allocates resource blocks suitable for the mobile terminal apparatus 10, and is thereby capable of transmitting the downlink transmission data to the mobile terminal apparatus 10 by the transmission processing (coordinated transmission, non-coordinated transmission) using the cluster pattern corresponding to the resource blocks. Further, since radio resources are fixedly allocated to the cluster patterns, it is possible to decrease the channel information•channel quality information from the mobile terminal apparatus 10.

Figure 17:
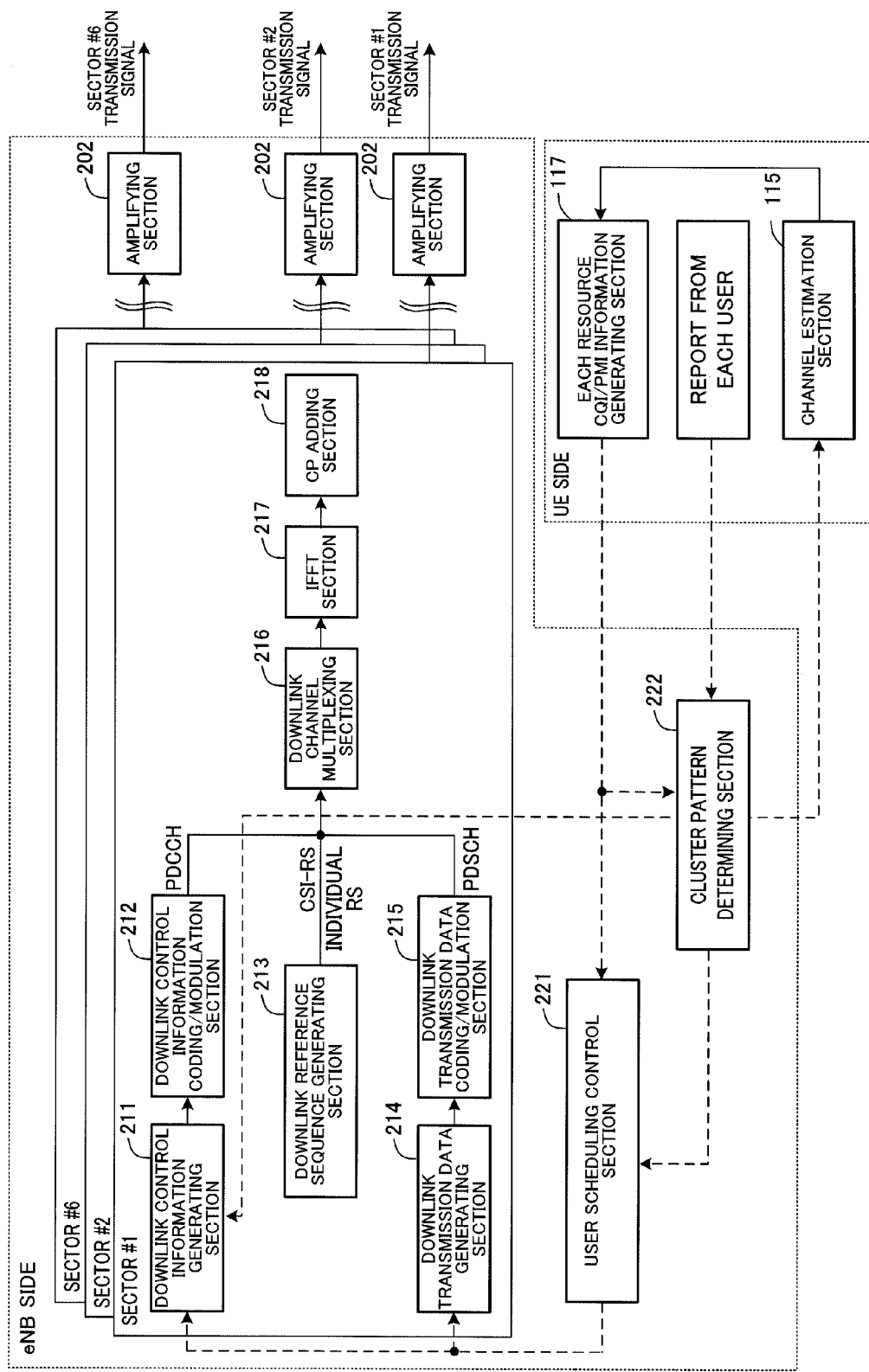
FIG. 17 is a functional block diagram for the base station apparatus to perform scheduling processing of dynamic allocation.

Next, functional blocks for the scheduling processing of dynamic allocation by the base station apparatus will be described with reference to FIG. 17. The functional blocks as shown in FIG. 17 are mainly of processing content of the baseband processing section. In addition, in FIG. 17, for convenience in description, the description is given while including a part of functional blocks of the mobile terminal apparatus. Further, functional blocks of the same names as in fixed allocation are assigned the same reference numerals to describe.

As shown in FIG. 17, in response to each of sectors #1 to #6, the base station apparatus 20 has downlink control information generating sections 211, downlink control information coding/modulation sections 212, downlink reference sequence generating sections 213, downlink transmission data generating sections 214, downlink transmission data coding/modulation sections 215, downlink channel multiplexing sections 216, IFFT sections 217, CP adding sections 218, and amplifying sections 202. Further, the base station apparatus 20 has the user scheduling control section 221 and cluster pattern determining section 222.

The downlink control information generating section 211 generates downlink control information (PDCCH) including pattern information indicating all cluster patterns that are candidates to allocation of radio resources for each update cycle (for each interval at which allocation of radio resources to cluster patterns is updated). In addition, the all cluster patterns that are candidates to allocation are made patterns by changing combinations of the serving sector and adjacent sector, and for example, are the coordinated cluster patterns #1 and #2 as shown in FIG. 4A. In other words, the coordinated cluster patterns #1 and #2 as first radio resource allocation candidates and the coordinated cluster patterns #1 and #2 as second radio resource allocation candidates are included in the downlink control information as the pattern information.

Further, the downlink control information generating section 211 generates downlink control information (PDCCH) including allocation information for periods except update cycles (except intervals at which allocation of radio resources to cluster patterns is updated). As well as the pattern information and allocation information, the downlink control information includes scheduling information of the PDSCH and PUSCH and format information of the modulation method, channel coding rate and the like. The downlink control information coding/modulation section 212 codes and modulates the downlink control information output from the downlink control information generating section 211 for each user. The downlink control information output from the downlink control information coding/modulation section 212 is input to the downlink channel multiplexing section 216.

The downlink reference sequence generating section 213 generates reference signals (CSI-RS, individual RS) for CQI measurement. The reference signal generated in the downlink reference sequence generating section 213 is input to the downlink channel multiplexing section 216. The downlink transmission data generating section 214 generates downlink transmission data (PDSCH) based on scheduling by the user scheduling control section 221. Further, the downlink transmission data generating section 214 controls average transmission power with a transmission power control section under control thereof. The downlink transmission data coding/modulation section 215 codes and modulates the downlink transmission data output from the downlink transmission data generating section 214 for each user. The downlink transmission data output from the downlink transmission data coding/modulation section 215 is input to the downlink channel multiplexing section 216.

The downlink control information, reference signal and downlink transmission data is channel-multiplexed in the downlink channel multiplexing section 216, undergoes processing such as interleaving, and then, is input to the IFFT section 217 as a downlink transmission signal. The IFFT section 217 performs Inverse Fast Fourier Transform (IFFT) to the downlink transmission signal, and transforms the signal of frequency waveform into the signal of time waveform. The CP adding section 218 adds a cyclic prefix to the signal of time waveform. The downlink transmission signal given the cyclic prefix is transmitted via the amplifying section 202.

The pattern information notified to the mobile terminal apparatus 10 via the downlink transmission signal is used in channel estimation. Based on the pattern information, the mobile terminal apparatus 10 identifies all cluster patterns that are candidates to allocation of radio resources. The mobile terminal apparatus 10 performs channel estimation in accordance with all cluster patterns for each resource block, and transmits CQI/PMI information to the base station apparatus 20 as the channel information as feedback.

Based on the feedback information from each mobile terminal apparatus 10 and report information of user distribution and the like, the cluster pattern determining section 222 determines the ratio of radio resources allocated to each cluster pattern, and determines allocation of radio resources to each cluster pattern. The cluster pattern determining section 222 inputs allocation information indicative of allocation of radio resources to each cluster pattern to the user scheduling control section 221.

Determination of cluster patterns by the cluster pattern determining section 222 is performed for each update cycle. The determined allocation information is included in the downlink control information and is notified to the mobile terminal apparatus 10 in the update cycle. Accordingly, during the update cycle, as in the scheduling processing of fixed allocation, the CQI/PMI Information is transmitted as feedback with allocation of radio resources to cluster patterns held.

The user scheduling control section 221 performs scheduling of uplink and downlink control information and uplink and downlink transmission data. In the transmission path in mobile communications, user throughput varies with each resource due to inter-sector interference, inter-cluster interference and the like. Therefore, the user scheduling control section 221 allocates resource blocks of good communication quality to each mobile terminal apparatus 10 for each subframe in transmitting the downlink transmission data to the mobile terminal apparatus 10.

At this point, the user scheduling control section 221 acquires the channel information channel quality information transmitted from the mobile terminal apparatus 10 as feedback, for resource blocks allocated to the cluster pattern. Then, the user scheduling control section 221 allocates resource blocks to the mobile terminal apparatus 10 so as to maximize the beforehand defined objective function. By allocation of resource blocks to each mobile terminal apparatus 10, selection of the cluster pattern applied to each mobile terminal apparatus 10 is implemented indirectly. In addition, as the objective function, used are Minimum rate maximization for maximizing a minimum rate among all users, Proportional fairness maximization for maximizing an instantaneous rate R(i) normalized by Avg(R_achieved) that is an average value of rates R_achieved that each user achieves previously (some previous time window), and the like.

Minimum-Rate Maximization

It means increasing the capacity of a user that is the lowest channel capacity among all users to a maximum extent. By this means, it is possible to reduce differences between channel capacities in all users.

$$\max_p \min_k R_{k,p}(i)$$

Proportional Fairness Maximization $$\max M_{k,p}(i) = \frac{R_{k,p}(i)}{Avg\{R_{achieved}(i)\}}$$

As a theoretical value of $R_{k,p}(i)$, $$\sum_{j=1}^{M_{r,k}} \log_2(1 + SNR(i)_{k,j,p})$$

is used, and used also are a value with AMC (Adaptive Modulation & Coding) expected and the like. $SNR_{k,j,p}(i)$ is an SNR value on the reception side in a reception antenna j of a user k with some cluster pattern p assumed in a subframe $M_{r,k}$ represents the number of reception antennas of the user k. As the SNR used in pattern selection, it is the best using the value that is calculated by the channel information channel quality information transmitted from the user side as feedback and that undergoes transmission precoding of Intra-eNB CoMP, but as well as the SNR, calculation of other SNR may be performed.

The user scheduling control section 221 determines MCS (coding rate, modulation scheme) that meets a predetermined block error rate in the allocated resource block. The downlink control information coding/modulation sections 212 and downlink transmission data coding/modulation sections 215 are set for parameters that meet the MCS determined in the user scheduling control section 221. Further, the user scheduling control section 221 inputs the allocation information of radio resource allocated to each cluster pattern to the downlink control information generating section 211. In addition, transmission power of each resource may be controlled by the downlink transmission data generating section 214 or the user scheduling control section 221.

Figure 18:
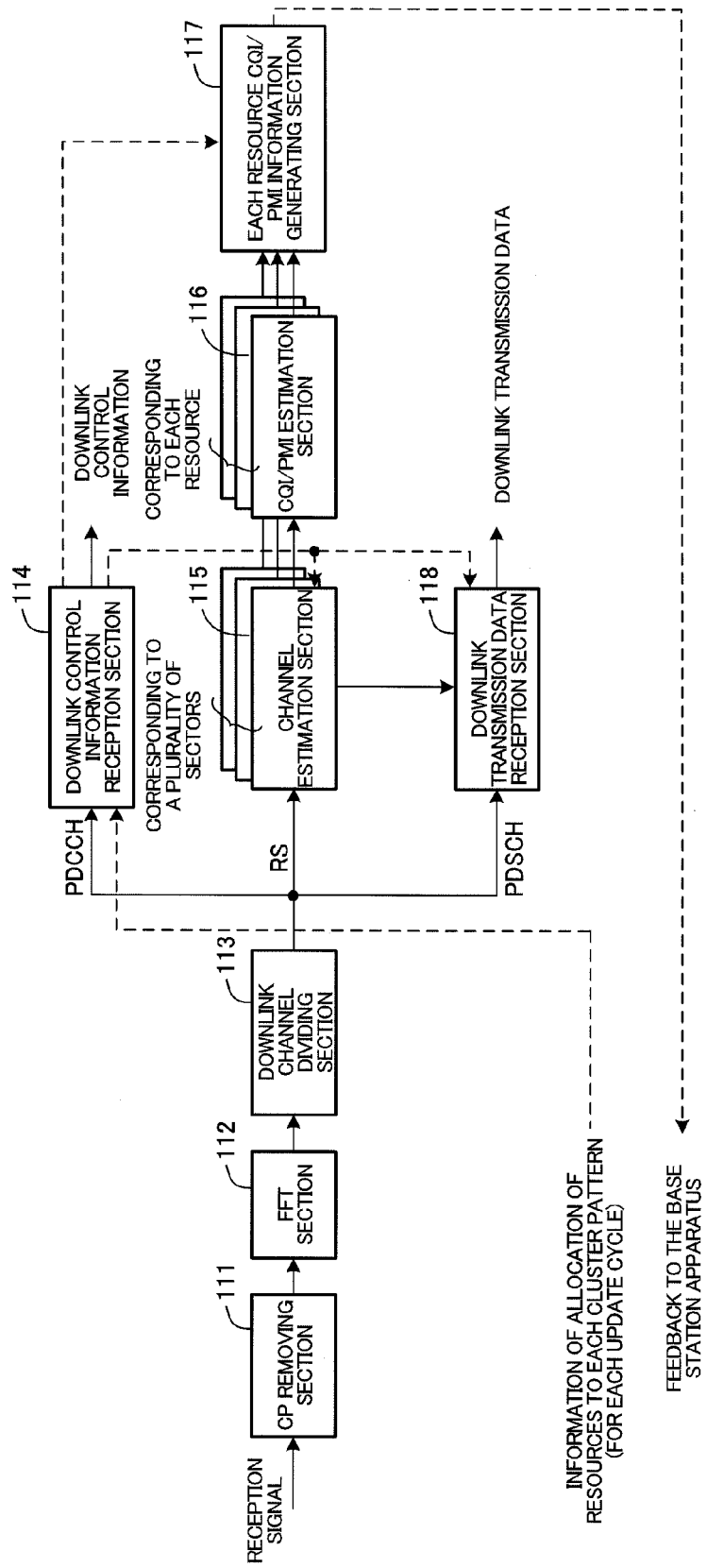
FIG. 18 is a functional block diagram for the mobile terminal apparatus to perform the scheduling processing of dynamic allocation.

Functional blocks for the scheduling processing of dynamic allocation by the mobile terminal apparatus will be described with reference to FIG. 18. The functional blocks as shown in FIG. 18 are mainly of processing content of the baseband processing section. Further, functional blocks of the same names as in fixed allocation are assigned the same reference numerals to describe.

As shown in FIG. 18, the mobile terminal apparatus 10 has the CP removing section 111, FFT section 112, downlink channel dividing section 113, downlink control information reception section 114, channel estimation sections 115, CQI/PMI estimation sections 116, each resource CQI/PMI information generating section 117, and downlink transmission data reception section 118. The CP removing section 111 removes a cyclic prefix added to a downlink reception signal from the base station apparatus 20. The FFT section 112 performs Fast Fourier Transform (FFT) to the downlink reception signal, and transforms the signal of time waveform into the signal of frequency waveform. The reception signal output from the FFT section 112 undergoes processing such as deinterleaving, then is input to the downlink channel dividing section 113, and is divided into downlink control information, downlink reference signal and downlink transmission data.

The downlink control information reception section 114 demodulates and decodes the downlink control information, and acquires uplink and downlink scheduling information, channel coding rate and the like. Further, the downlink control information reception section 114 acquires the pattern information from the downlink control information for each update cycle (for each interval at which allocation of radio resources to cluster patterns is updated), and acquires the allocation information from the downlink control information for periods except update cycles (except intervals at which allocation of radio resources to cluster patterns is updated). The downlink control information reception section 114 changes reception formats of the channel estimation section 115 and downlink transmission data reception section 118 in accordance with the cluster pattern, from the cluster patterns and the number of cluster patterns indicated by the allocation information.

The channel estimation section 115 obtains a channel estimation value between the transmission antenna of the base station apparatus 20 and the reception antenna of the mobile terminal apparatus 10. The channel estimation section 115 obtains the channel estimation value in accordance with all cluster patterns that are candidates to allocation of radio resources for each update cycle (for each interval at which allocation of radio resources to cluster patterns is updated). More specifically, the channel estimation section 115 obtains channel estimation values of the serving sector and all peripheral sectors included in the same cluster with the cluster pattern. For example, in the case of FIG. 4A, channel estimation values of sectors S1, S2 and S6 are obtained.

Further, for periods except update cycles (except intervals at which allocation of radio resources to cluster patterns is updated), the channel estimation section 115 obtains the channel estimation value in accordance with the cluster pattern assigned each resource. More specifically, the channel estimation section 115 obtains not only the channel estimation value of the serving sector but also the channel estimation value of the adjacent sector in the same cluster in the radio resources of the coordinated cluster pattern. Meanwhile, the channel estimation section 115 obtains the channel estimation value of the serving sector in the radio resources of the non-coordinated cluster pattern.

The channel estimation value is input to the CQI/PMI estimation section 116, and also is input to the downlink transmission data reception section 118 for demodulation of the downlink transmission data. Using the channel estimation value, the CQI/PMI estimation section 116 estimates the CQI and PMI (Precoding Matrix Indicator) for each resource block.

The each resource CQI/PMI information generating section 117 generates the CQI/PMI information for each resource block, based on the CQI estimation values and PMI estimation values output from the CQI/PMI estimation sections 116. The each resource CQI/PMI information generating section 117 generates the CQI/PMI information for each resource block in accordance with all cluster patterns that are candidates to allocation of radio resources, for each update cycle (for each interval at which allocation of radio resources to cluster patterns is updated). Further, the each resource CQI/PMI information generating section 117 generates the CQI/PMI information in accordance with the corresponding cluster pattern for each resource block, for periods except update cycles (except intervals at which allocation of radio resources to cluster patterns is updated).

The CQI/PMI information is transmitted to the base station apparatus 20 as feedback in accordance with the cluster pattern corresponding to each resource block. The transmission data reception section 118 demodulates and codes the downlink transmission data to acquire the downlink transmission data, based on the downlink scheduling information from the downlink control information reception section 114 and the channel estimation value from the channel estimation section 115.

Figure 19:
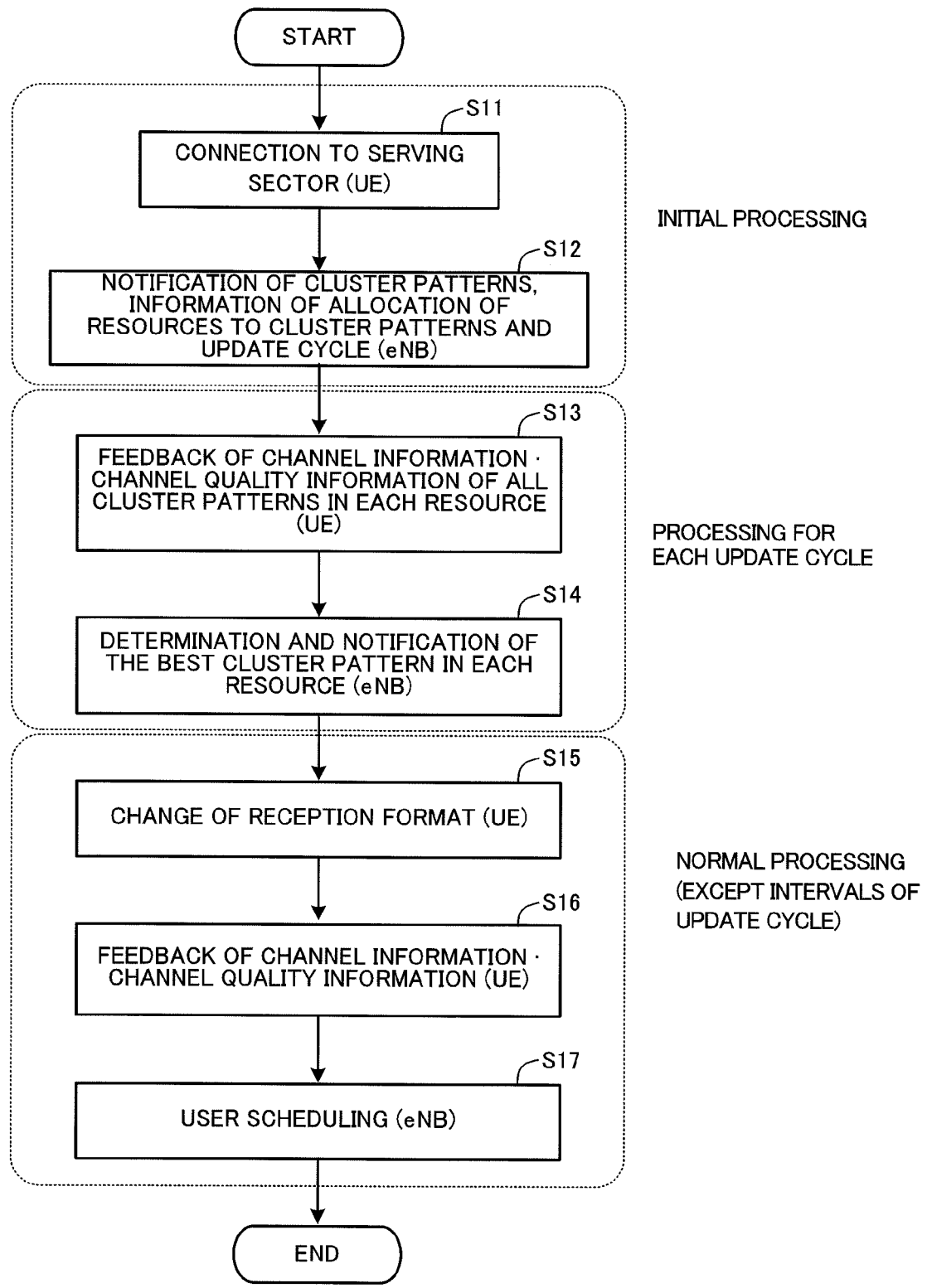
FIG. 19 is a flowchart of the scheduling processing of dynamic allocation.

The entire flow of the scheduling processing of dynamic allocation will be described with reference to FIG. 19. As shown in FIG. 19, as the initial processing, when the mobile terminal apparatus 10 connects to the serving sector (step S11), the base station apparatus 20 notifies the mobile terminal apparatus 10 of pattern information and update cycle information (step S12). In this case, the base station apparatus 20 notifies the mobile terminal apparatus 10 of all cluster patterns that are candidates to allocation of radio resources. The initial processing of steps S11 and S12 is performed only in starting connection between the mobile terminal apparatus 10 and the sector.

Next, as the processing for each cycle, the mobile terminal apparatus 10 transmits the channel information•channel quality information to the base station apparatus 20 as feedback in accordance with all cluster patterns for each resource block (step S13). Based on the feedback information from the mobile terminal apparatus 10, the base station apparatus 20 determines the best cluster pattern in radio resources, and notifies the mobile terminal apparatus 10 of allocation information (step S14). In this case, the base station apparatus 20 notifies the mobile terminal apparatus 10 of the allocation information indicative of allocation in a semi-fixed manner of radio resources to each cluster pattern. The processing for each cycle of steps S13 and S14 is performed at the update cycle indicated by the update cycle information.

Next, as normal processing, the mobile terminal apparatus 10 changes the reception format in accordance with the cluster pattern for each resource block (step S15), and transmits the channel information channel quality information to the base station apparatus 20 as feedback in accordance with the cluster pattern for each resource block (step S16). Based on the feedback information from the mobile terminal apparatus 10, the base station apparatus 20 allocates resource blocks that ensure certain user throughput to the mobile terminal apparatus 10 (step S17). By this allocation of resource blocks, the cluster pattern for the mobile terminal apparatus 10 is also selected. In addition, in step S14, the base station apparatus 20 may be configured to allocate resource blocks to the mobile terminal apparatus 10 at the time of determining the best cluster pattern.

Thus, in the scheduling processing of dynamic allocation, it is possible to respond to changes of system status such as the user distribution with flexibility by dynamic allocation. Therefore, it is possible to further improve fairness of user throughput (reduce the difference in throughput characteristics between users). Further, the base station apparatus 20 allocates resource blocks suitable for the mobile terminal apparatus 10, and is thereby capable of transmitting the downlink transmission data to the mobile terminal apparatus 10 by the transmission processing (coordinated transmission, non-coordinated transmission) using the cluster pattern corresponding to the resource blocks.

As described above, according to the scheduling method according to this Embodiment, coordinated transmission is performed among adjacent sectors by coordinated cluster patterns, it is thereby possible to improve throughput on the sector border, and it is thus possible to enhance fairness of user throughput of the sector center and the sector border (reduce the difference in throughput characteristics between users). Further, since different radio resources are allocated for each cluster pattern, when user throughput decreases by the coordinated cluster pattern, it is possible to allocate other radio resources to the mobile terminal apparatus with another cluster pattern and to improve user throughput. Accordingly, it is possible to further improve fairness of user throughput (reduce the difference in throughput characteristics between users).

Herein, as orthogonal radio resources, the description is given while assuming different frequency blocks, and a block of the same frequency may be orthogonalized in time division. Alternatively, as orthogonal radio resources, an orthogonal CSI measurement reference signal (for example, CSI-RS) pattern may be inserted in a block of the same frequency to regard orthogonal radio resources as the orthogonal reference signal.

The present invention is not limited to the above-mentioned Embodiment, and is capable of being carried into practice with various modifications thereof. For example, without departing from the scope of the invention, configurations and kinds of cluster patterns, the number of processing sections, and processing procedures in the above-mentioned descriptions are capable of being carried into practice with modifications thereof as appropriate. Moreover, the invention is capable of being carried into practice with modifications thereof as appropriate without departing from the scope of the invention.

The present application is based on Japanese Patent Application No. 2010-240751 filed on Oct. 27, 2010, entire content of which is expressly incorporated by reference herein.

The invention claimed is:

1. A base station apparatus comprising:
   a notification section configured to notify a mobile terminal apparatus of allocation information of radio resources to each of cluster patterns, different radio resources being allocated to the cluster patterns, each of the cluster patterns being made a pattern with a plurality of adjacent sectors as a cluster unit;
   a reception section configured to receive channel information and/or channel quality information corresponding to each of the cluster patterns for each of the radio resources from the mobile terminal apparatus; and
   a control section that controls allocation of the radio resources to the mobile terminal apparatus, based on the channel information and/or the channel quality information,
   wherein at least one of the cluster patterns is a coordinated cluster pattern that is made a pattern with a plurality of coordinated adjacent sectors as the cluster unit.

2. The base station apparatus according to claim 1, wherein the plurality of cluster patterns is two kinds of coordinated cluster patterns or more comprised of clusters made by changing combinations of adjacent sectors.

3. The base station apparatus according to claim 2, wherein the plurality of cluster patterns includes a non-coordinated cluster pattern to perform non-coordinated transmission for each sector.

4. The base station apparatus according to claim 1, wherein the plurality of cluster patterns includes a non-coordinated cluster pattern to perform non-coordinated transmission for each sector.

5. The base station apparatus according to claim 4, wherein average transmission power of the radio resources allocated to the non-coordinated cluster pattern is controlled to be average transmission power different from average transmission power of the radio resources allocated to the coordinated cluster pattern.

6. The base station apparatus according to claim 1, wherein allocation of the radio resources to each of the cluster patterns is individually performed independently of another adjacent base station apparatus.

7. The base station apparatus according to claim 1, wherein the notification section notifies the mobile terminal apparatus of allocation information to allocate the radio resources fixedly to each of the cluster patterns,
   the reception section receives channel information and/or channel quality information corresponding to each of the cluster patterns fixed for each of the radio resources from the mobile terminal apparatus, and
   the control section controls allocation of the radio resources to the mobile terminal apparatus, based on the channel information and/or the channel quality information.

8. The base station apparatus according to claim 1, further comprising:
   a cluster pattern determining section that determines allocation of the radio resources to each of the cluster patterns based on channel information and/or channel quality information from the mobile terminal apparatus, in dynamically allocating the radio resources to each of the cluster patterns,
   wherein the notification section notifies the mobile terminal apparatus of pattern information indicative of all cluster patterns that are candidates to allocation of the radio resources before determination in the cluster pattern determining section,
   the reception section receives channel information and/or channel quality information corresponding to the all cluster patterns for each of the radio resources before determination in the cluster pattern determining section, and
   the cluster pattern determining section determines allocation of the radio resources to each of the cluster patterns of the allocation information notified from the notification section, based on the channel information and/or the channel quality information.

9. The base station apparatus according to claim 8, wherein the control section controls allocation of the radio resources to the mobile terminal apparatus, based on channel information and/or channel quality information corresponding to allocation of the radio resources to each of the cluster patterns in the cluster pattern determining section, before notification of the allocation information in the notification section.

10. A mobile terminal apparatus comprising:
   a reception section configured to receive allocation information of radio resources to each of cluster patterns from a base station apparatus, different radio resources being allocated to the cluster patterns, each of the cluster patterns being made a pattern with a plurality of adjacent sectors as a cluster unit; and
   a channel information generating section configured to generate channel information and/or channel quality information corresponding to each of the cluster patterns for each of the radio resources,
   wherein allocation of the radio resources in the base station apparatus is controlled by feedback of the channel information and/or channel quality information to the base station apparatus, and at least one of the cluster patterns is a coordinated cluster pattern that is made a pattern with a plurality of coordinated adjacent sectors as the cluster unit.

11. The mobile terminal apparatus according to claim 10, wherein the plurality of cluster patterns is two kinds of coordinated cluster patterns or more comprised of clusters made by changing combinations of adjacent sectors.

12. The mobile terminal apparatus according to claim 11, wherein the plurality of cluster patterns includes a non-coordinated cluster pattern to perform non-coordinated transmission for each sector.

13. The mobile terminal apparatus according to claim 1, wherein the plurality of cluster patterns includes a non-coordinated cluster pattern to perform non-coordinated transmission for each sector.

14. The mobile terminal apparatus according to claim 13, wherein average transmission power of the radio resources allocated to the non-coordinated cluster pattern is controlled to be average transmission power different from average transmission power of the radio resources allocated to the coordinated cluster pattern.

15. The mobile terminal apparatus according to claim 10, wherein allocation of the radio resources to each of the cluster patterns is individually performed among a plurality of adjacent base station apparatuses.

16. The mobile terminal apparatus according to claim 10, wherein the reception section receives, from the base station apparatus, allocation information to allocate the radio resources fixedly to each of the cluster patterns,
the channel information generating section generates channel information and/or channel quality information corresponding to the cluster pattern fixed to the radio resources, and
control in the base station apparatus is to control allocation of the radio resources by feedback of the channel information and/or the channel quality information to the base station apparatus.

17. The mobile terminal apparatus according to claim 10, wherein the base station apparatus determines allocation of the radio resources to each of the cluster patterns based on channel information and/or channel quality information from the mobile terminal apparatus, in dynamically allocating the radio resources to each of the cluster patterns,
the reception section receives pattern information indicative of all cluster patterns that are candidates to allocation of the radio resources before allocation of the cluster patterns from the mobile terminal apparatus,
the channel information generating section generates channel information and/or channel quality information corresponding to the all cluster patterns for each of the radio resources before allocation of the cluster patterns, and
the base station apparatus determines allocation of the radio resources to each of the cluster patterns of the allocation information received in the reception section, based on the channel information and/or the channel quality information.

18. A scheduling method comprising:
notifying a mobile terminal apparatus of allocation information of radio resources to each of cluster patterns, different radio resources being allocated to the cluster patterns, each of the cluster patterns being made a pattern with a plurality of adjacent sectors as a cluster unit;
receiving channel information and/or channel quality information corresponding to each of the cluster patterns for each of the radio resources from the mobile terminal apparatus; and
controlling allocation of radio resources to the mobile terminal apparatus, based on the channel information and/or the channel quality information,
wherein at least one of the cluster patterns is a coordinated cluster pattern that is made a pattern with a plurality of coordinated adjacent sectors as the cluster unit.

* * * * *